US011847736B2

(12) United States Patent
Delgado et al.

(10) Patent No.: US 11,847,736 B2
(45) Date of Patent: Dec. 19, 2023

(54) SYSTEMS AND METHODS FOR MODIFYING LIGHTING IN THREE-DIMENSIONAL MODELS

(71) Applicant: SHOPIFY INC., Ottawa (CA)

(72) Inventors: Byron Leonel Delgado, Ottawa (CA); Stephan Leroux, East Gwillimbury (CA); Daniel Beauchamp, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/237,372

(22) Filed: Apr. 22, 2021

(65) Prior Publication Data

US 2022/0343592 A1 Oct. 27, 2022

(51) Int. Cl.
  *G06T 15/50* (2011.01)
  *G06T 17/20* (2006.01)
  *G06T 15/04* (2011.01)

(52) U.S. Cl.
  CPC ............ *G06T 15/506* (2013.01); *G06T 15/04* (2013.01); *G06T 17/205* (2013.01)

(58) Field of Classification Search
  CPC ...... G06T 15/506; G06T 15/04; G06T 17/205
  See application file for complete search history.

(56) References Cited

U.S. PATENT DOCUMENTS

| | | | | |
|---|---|---|---|---|
| 9,396,580 | B1 * | 7/2016 | Nowrouzezahrai | G06T 15/50 |
| 9,619,920 | B2 * | 4/2017 | Howell | G06T 15/80 |
| 10,210,664 | B1 * | 2/2019 | Chaturvedi | G06Q 30/0643 |
| 10,885,701 | B1 * | 1/2021 | Patel | G06T 19/006 |
| 2012/0008854 | A1 * | 1/2012 | Shim | G06T 15/506 382/154 |
| 2014/0253546 | A1 * | 9/2014 | Hickman | G06T 15/20 345/419 |
| 2014/0267412 | A1 * | 9/2014 | Calian | G06T 19/006 345/633 |
| 2017/0358120 | A1 * | 12/2017 | Ambrus | G06T 15/04 |
| 2018/0089874 | A1 * | 3/2018 | Wu | G06T 15/506 |
| 2019/0026937 | A1 * | 1/2019 | Benoit | G06T 19/20 |
| 2019/0147221 | A1 * | 5/2019 | Grabner | G06T 19/006 382/103 |
| 2019/0340306 | A1 * | 11/2019 | Harrison | G06N 5/04 |
| 2019/0349264 | A1 * | 11/2019 | Cahill | H04L 41/0806 |

(Continued)

OTHER PUBLICATIONS

Osti et al., Real Time Shadow Mapping for Augmented Reality Photorealistic Rendering, MDPI Applied Sciences, May 2019, pp. 1-20 (Year: 2019).*

*Primary Examiner* — Phuc N Doan

(57) ABSTRACT

The consistent use of lighting in different instances of digital media may help ensure that objects are depicted in a similar manner in the digital media. However, in some cases, a three-dimensional (3D) model may depict an object under lighting conditions that differ from the lighting conditions depicted in other digital media. The present disclosure provides systems and methods for generating 3D models to include lighting that is consistent with the lighting used in other digital media. According to an embodiment, a lighting template is determined based on digital media depicting a first physical object. A modified 3D model of a second physical object is then generated based on the lighting template to light the second physical object according to the lighting template.

21 Claims, 11 Drawing Sheets

(56) References Cited

U.S. PATENT DOCUMENTS

| | | | |
|---|---|---|---|
| 2020/0035032 A1* | 1/2020 | Klein | G06T 15/50 |
| 2020/0038686 A1* | 2/2020 | Li | A61N 5/1048 |
| 2020/0066030 A1* | 2/2020 | Naik | G06T 7/90 |
| 2020/0110910 A1* | 4/2020 | Harrison | G05B 13/0265 |
| 2020/0234490 A1* | 7/2020 | Rezaiifar | G06T 7/50 |

* cited by examiner

SYSTEMS AND METHODS FOR MODIFYING LIGHTING IN THREE-DIMENSIONAL MODELS

FIELD

The present application relates to computer graphics and, in particular embodiments, to computer graphics lighting.

BACKGROUND

Computer graphics lighting is a way to simulate the light being reflected off of and/or emitted by virtual objects. By way of example, computer graphics lighting may be used to illuminate the surfaces of a virtual object in a 3D model. The illumination of the virtual object may have a large effect on how that object appears to a user that is interacting with the 3D model. Different lighting conditions may alter how the color, texture and/or other material properties of the virtual object are depicted in renders of the 3D model. Accordingly, lighting is an important consideration in the generation of 3D models.

SUMMARY

Some embodiments of the present disclosure relate to generating and/or modifying 3D models to include lighting that is consistent with the lighting used in other related digital media. Related digital media may include images, videos and/or other 3D models that depict the same object or associated objects (e.g., objects related to the same type of product). An example of related digital media is an image of a product and a 3D model of that product. Using consistent lighting to illuminate the product in both the image and the 3D model may help depict the colors, textures and other properties of the product in a consistent manner.

A lighting template may be employed to help provide consistent lighting across multiple instances of related digital media. For example, a lighting template may be determined from one or more instances of pre-existing digital media depicting an object or multiple associated objects. This lighting template may represent the lighting of the object (or the multiple associated objects) as depicted in the pre-existing digital media. The lighting template may then be applied to a 3D model of an object to produce a modified 3D model lit according to the lighting template, where the object in the 3D model may be one that is depicted in the pre-existing digital media or may be a different object.

According to an aspect of the present disclosure, there is provided a computer-implemented method including determining, based on digital media depicting a first physical object, a lighting template representing lighting of the first physical object as depicted in the digital media. This digital media may include at least one of an image, a video or a 3D model. The method may further include obtaining a 3D model of a second physical object associated with the first physical object and generating, based on the 3D model and the lighting template, a modified 3D model of the second physical object lit according to the lighting template. The first physical object may be the same as the second physical object. Alternatively, the first physical object may correspond to a first product sold by a merchant and the second physical object may correspond to a second product sold by that merchant.

In some embodiments, determining the lighting template includes determining properties of a light source that at least partially provides the lighting of the first physical object as depicted in the digital media. These properties of the light source may include a position of the light source relative to the first physical object as depicted in the digital media and/or a type of light source. In these embodiments, generating the modified 3D model may include adding a virtual light source to the 3D model, where properties of the virtual light source are based on the properties of the light source. For example, adding the virtual light source to the 3D model may include placing the virtual light source in the 3D model at a virtual position that is based on the position of the light source relative to the first physical object as depicted in the digital media. The virtual light source may also or instead include the same type of light source.

In some embodiments, the lighting of the first physical object as depicted in the digital media is first lighting. Generating the modified 3D model may include normalizing second lighting of the second physical object as depicted in the 3D model to obtain normalized lighting and modifying the normalized lighting based on the lighting template.

In some embodiments, generating the modified 3D model is performed before determining the lighting template. Determining the lighting template may then include comparing the modified 3D model to the digital media; determining, based on the comparing, that the modified 3D model matches the digital media; and, responsive to determining that the modified 3D model matches the digital media, determining that the modified 3D model includes the lighting template. Alternatively or additionally, determining the lighting template may include multiple iterations of generating a respective modified 3D model based on the 3D model and a respective lighting template and comparing the respective modified 3D model to the digital media.

In some embodiments, determining the lighting template includes determining an environment map for an environment containing the first physical object. Generating the modified 3D model may then include applying the environment map to the 3D model.

In some embodiments, generating the modified 3D model includes modifying a texture map of the 3D model based on the lighting template.

In some embodiments, the digital media includes multiple different instances of digital media. The multiple different instances of digital media may depict multiple different physical objects including the first physical object. Determining the lighting template may include averaging different lighting depicted in the different instances of digital media.

According to another aspect of the present disclosure, there is provided a system including memory to store a 3D model of a second physical object associated with a first physical object and at least one processor. The at least one processor may be configured to determine, based on digital media depicting the first physical object, a lighting template representing lighting of the first physical object as depicted in the digital media; and to generate, based on the 3D model and the lighting template, a modified 3D model of the second physical object lit according to the lighting template.

In some embodiments, the lighting template comprises properties of a light source that at least partially provides the lighting of the first physical object as depicted in the digital media. The at least one processor may be configured to add a virtual light source to the 3D model to generate the modified 3D model, where properties of the virtual light source may be based on the properties of the light source. The properties of the light source may include a position of the light source relative to the first physical object as depicted in the digital media, and the at least one processor may be to place the virtual light source in the 3D model at a virtual position that is based on the position of the light source relative to the first physical object as depicted in the digital media. Alternatively or additionally, the properties of the light source may include a type of light source and the virtual light source may include the same type of light source.

In some embodiments, the lighting of the first physical object as depicted in the digital media is first lighting. The at least one processor may be configured to normalize second lighting of the second physical object as depicted in the 3D model to obtain normalized lighting and modify the normalized lighting based on the lighting template to generate the modified 3D model.

In some embodiments, the at least one processor is configured to compare the modified 3D model to the digital media; determine, based on the comparison, that the modified 3D model matches the digital media; and, responsive to the determination that the modified 3D model matches the digital media, determine that the modified 3D model includes the lighting template. Alternatively or additionally, the at least one processor may be configured to generate a plurality of modified 3D models based on the 3D model and respective lighting templates and compare the plurality of modified 3D models to the digital media to determine the lighting template representing the lighting of the first physical object as depicted in the digital media.

In some embodiments, the lighting template includes an environment map for an environment containing the first physical object. The at least one processor may apply the environment map to the 3D model to generate the modified 3D model.

In some embodiments, the at least one processor is configured to modify a texture map of the 3D model based on the lighting template to generate the modified 3D model.

In some embodiments, the digital media includes multiple different instances of digital media. The at least one processor may average different lighting depicted in the different instances of digital media to determine the lighting template.

According to yet another aspect of the present disclosure, there is provided a non-transitory computer readable medium storing computer executable instructions. When executed by a computer, the computer executable instructions cause the computer to determine, based on digital media depicting a first physical object, a lighting template representing lighting of the first physical object as depicted in the digital media; obtain a 3D model of a second physical object associated with the first physical object; and generate, based on the 3D model and the lighting template, a modified 3D model of the second physical object lit according to the lighting template.

BRIEF DESCRIPTION OF THE DRAWINGS

Embodiments will be described, by way of example only, with reference to the accompanying figures wherein.

DETAILED DESCRIPTION

Figure 1:
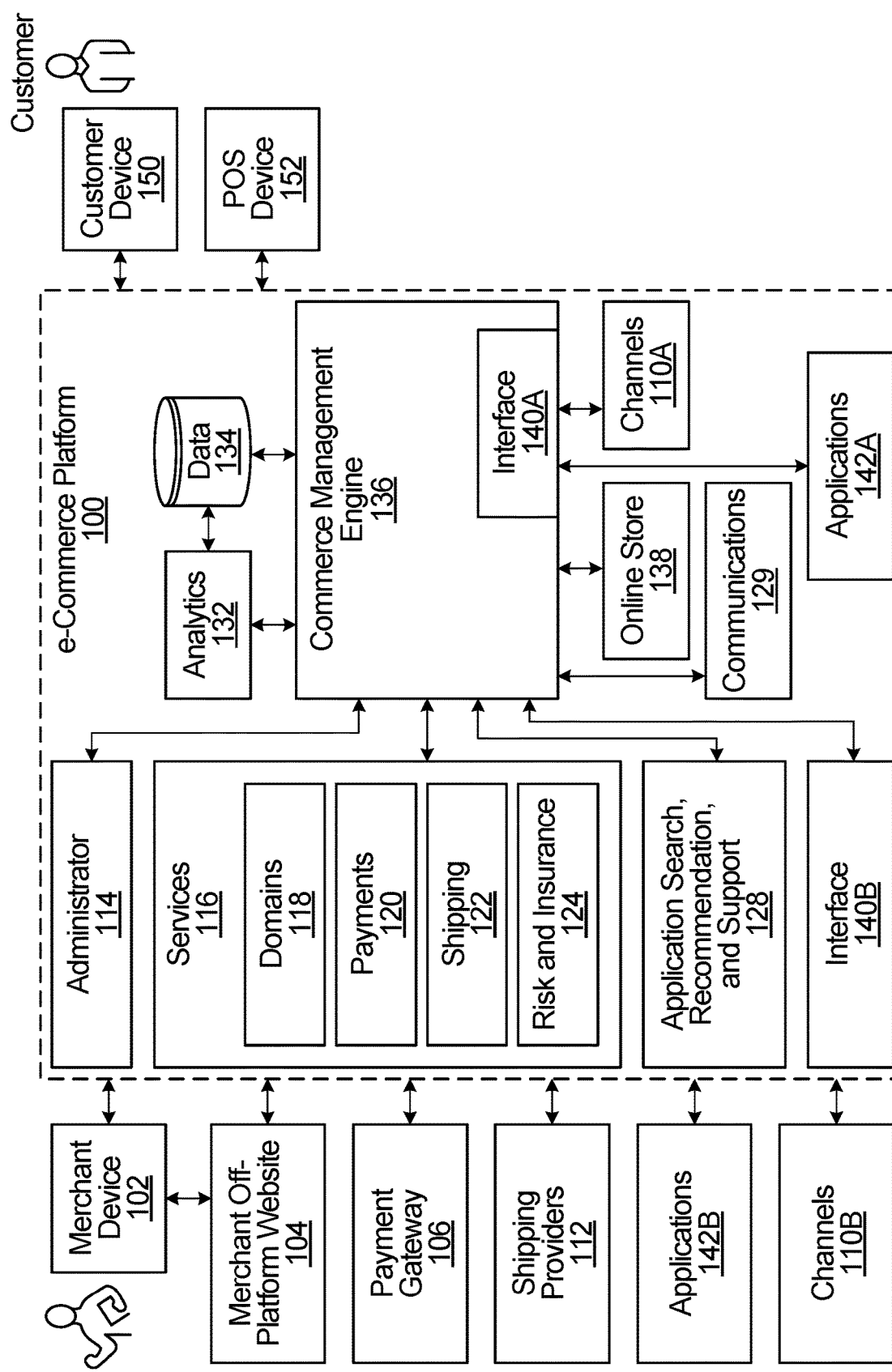
FIG. 1 is a block diagram of an e-commerce platform, according to an embodiment.

For illustrative purposes, specific example embodiments will now be explained in greater detail below in conjunction with the figures.

Lighting in Digital Media

Digital media, which may include images, videos, three-dimensional (3D) models and/or other forms of digital content, can be used to depict physical or virtual objects. The lighting used to illuminate an object depicted in digital media may have a large impact on how that object is represented. For example, lighting can create gradients, shadows and/or reflections on the surfaces of an object, which can affect how the texture, color and/or shape of the object appears. In some cases, lighting may be used to highlight certain material properties of an object. For example, gradients may be applied to highlight a glossy or reflective surface of an object in an image. Improperly applying lighting can alter or distort the real-world appearance of a physical object. By way of example, applying a bright light to an object may washout or otherwise distort the color of the object.

The lighting that illuminates an object or scene in digital media may also be referred to as the "lighting conditions" for the digital media. Examples of different light conditions include, inter alia, natural light, studio light, a light box and any combination thereof. Lighting in digital media may include real-world lighting and/or computer-generated lighting. An example of real-world lighting is sunlight illuminating the surfaces of a physical object in a photograph. An example of computer-generated lighting is a virtual light source used to illuminate surfaces of a virtual object in a 3D model.

In general, the lighting depicted in digital media may include the light sources and the light interactions depicted in the digital media. There exists a wide range of different light sources having different properties. The properties of a light source may include, inter alia, the brightness or intensity of the light source (e.g., in lumens), the color of the light source (e.g., in terms of the red-green-blue (RGB) color model or in terms of color temperature in Kelvin), the location of the light source (e.g., the coordinates of the light source), the directionality of the light source, the spread of the light source, and the type of light source. Examples of different types of light sources include:

point light sources that emit light in all directions from a single location (e.g., a standalone light bulb);

a directional light source that uniformly emits light in one direction (e.g., sunlight);

a spotlight that produces a cone of light (e.g., a flashlight), and ambient light that produces general illumination with no directionality (e.g., light reflected from multiple surfaces in a room).

Light interactions represent how light from a light source interacts with a surface virtually or in the real-world. Light interactions on a surface are generally based on the material properties of the surface and the properties of the light source(s) illuminating the surface. In some cases, light interactions may be broken down into diffuse, ambient and specular lighting. Diffuse lighting is the directional light that is reflected by a surface from a light source and may provide the main component of a surface's brightness and color. Ambient lighting is directionless light reflected from ambient light sources. Specular lighting provides shine and highlights on a surface from a light source and may be based on the specular reflection properties of the surface.

Providing realistic and consistent lighting in 3D models may be an important consideration. In some cases, a 3D model may be generated to represent a real-world, physical object, and appropriate lighting may be used to ensure that the 3D model appears realistic. Further, appropriate lighting may be used to ensure that the 3D model depicts the object in a manner that is consistent with representations of that object or similar objects in other digital media. By way of example, in the field of e-commerce, a product might be depicted in product images and 3D product models using fixed lighting conditions to help provide a consistent representation of the product. Consistent lighting might also be important in other applications of 3D models, including computer aided design (CAD), medical imaging and scientific imaging, for example.

Some embodiments provide systems and methods for modifying the lighting in a 3D model based on the lighting used in other related digital media. This may help ensure that a 3D model illustrates an object in a similar manner to other digital media related to the object, which may provide a consistent representation of the object.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products, an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
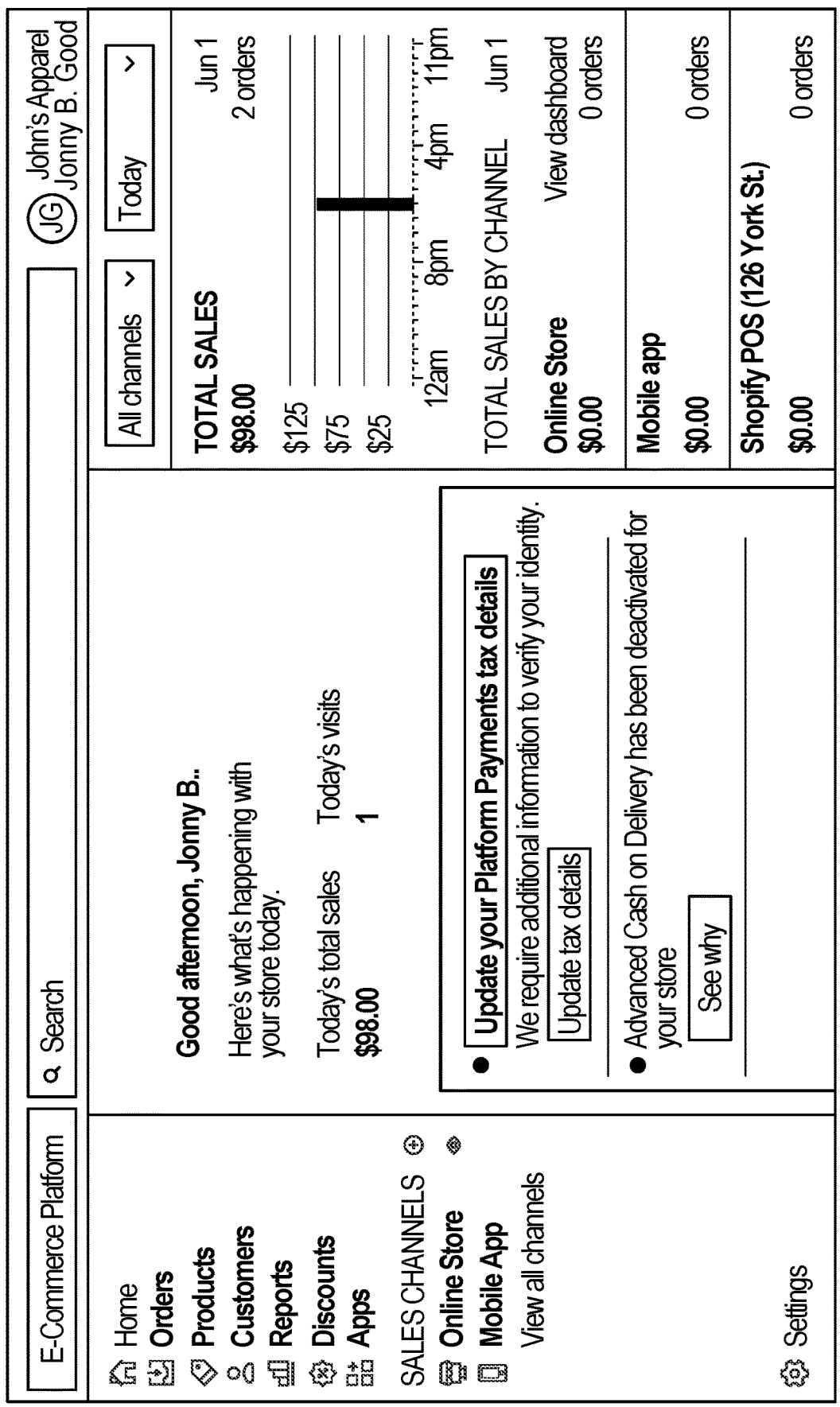
FIG. 2 is an example of a home page of an administrator, according to an embodiment.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Lighting in Digital Product Media

Merchants often present products to customers via digital product media. Digital product media, or "digital product assets", may be any digital media (e.g., an image, video and/or 3D model) that depicts a product. In some cases, digital product media may be provided in an online store and/or in digital advertising to allow a customer to view a product. Customers may judge the quality of a product based on how it is presented in digital product media, and therefore product photography, videography and/or modeling can play an important role in attracting customers to a product.

As outlined above, lighting may have a large impact on how an object is depicted in digital media. Some merchants might prefer that related product media use similar or identical lighting to depict one or more products in a consistent manner. Related product media may include any digital media that depicts a particular product or set of associated products. For example, when browsing an online store, a customer may view multiple photographs and a 3D model of a product, possibly in quick succession. Any differences in the lighting used in the photographs and the 3D model may create an inconsistent and, potentially, even jarring experience for the customer. If the photographs use certain lighting that illustrates the color and texture of the product in a particular way, then seeing the color and texture of the product illustrated using different lighting in the 3D model may be confusing for the customer. This may ultimately lead to reduced product appeal and/or reduced sales.

The use of consistent lighting by a merchant might not be limited to digital media depicting one product. A merchant may wish to apply consistent lighting to multiple different variants of a product, a group of related products (e.g., a product collection) or even their entire product catalog. This may allow customers to more easily compare different products and/or different product variants sold by the merchant. In one example, if two similar products only differ in material texture and/or color, then the use of consistent lighting in product media depicting those products may be important to ensure that the differences are clear to a customer. In another example, a merchant might want to apply specific lighting to digital media for a product collection to convey a certain atmosphere for that product collection, such as the use of bright, vibrant lighting for a "Spring Collection" of products.

The use of consistent lighting in related product media may be difficult for a merchant to achieve in practice. For example, merchants might not create 3D models of their products at the same time and/or in the same environment that they create their product images. A merchant may capture product photographs in a studio and then, at a later time, create a 3D model of the product at home. This disconnect between creating product images and creating 3D product models may occur for a wide variety of reasons, including because the merchant was unaware of the possibility of 3D models; the platform supporting the merchant's online store did not previously enable 3D models; the merchant wanted to begin selling products quickly, before creating the 3D models; cost constraints delayed the creation of the 3D models; and/or the merchant obtained their product photographs from an external source that did not offer 3D models (e.g., from a pre-existing product catalog).

Creating a 3D product model after creating other related product media may mean that the lighting depicted in the 3D model significantly differs from the lighting used in the other product media. This discrepancy in lighting may create noticeable differences in product appearance between the 3D model and the other product media. Accordingly, ensuring that consistent lighting is used across related product media may be a challenge for merchants.

Figure 3:
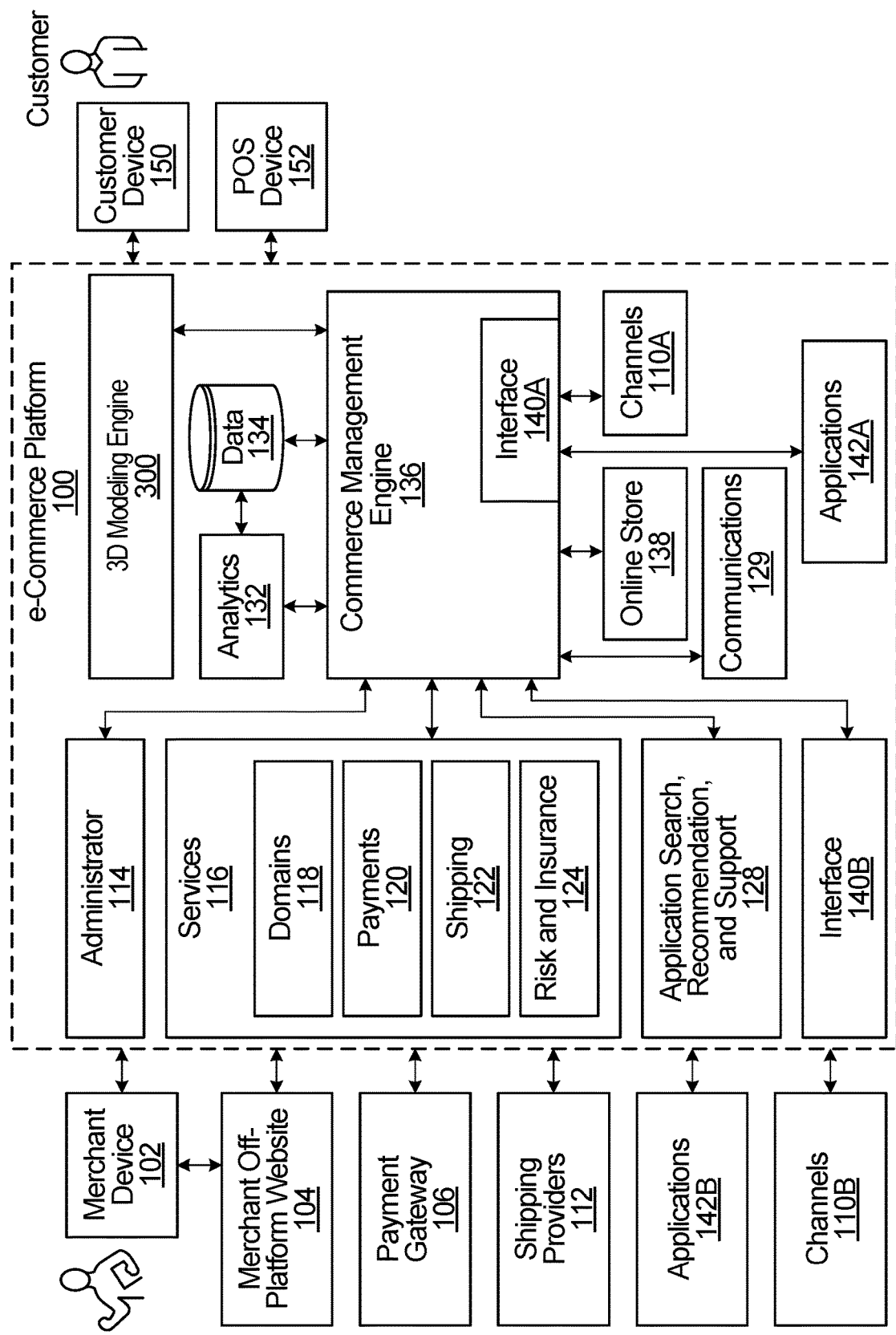
FIG. 3 illustrates the e-commerce platform of FIG. 1, but including an 3D modeling engine.

FIG. 3 illustrates the e-commerce platform 100 of FIG. 1, but including an 3D modeling engine 300. The 3D modeling engine 300 is an example of a computer-implemented system for generating and modifying 3D models of objects. The 3D modeling engine 300 may be implemented to modify the lighting used in a 3D model of an object based on lighting used in other digital media. By way of example, the 3D modeling engine 300 may determine a lighting template for the other digital media. This lighting template may represent the lighting of one or more objects depicted in the digital media. The 3D modeling engine 300 may then apply the lighting template to the 3D model of the object, which may generate a modified 3D model that depicts the object being lit according to the lighting template. In this way, the lighting in the modified 3D model may be consistent with the lighting in the other digital media. Example methods for determining a lighting template and generating a modified 3D model are provided elsewhere herein.

Although the 3D modeling engine 300 is illustrated as a distinct component of the e-commerce platform 100 in FIG. 3, this is only an example. A 3D modeling engine could also or instead be provided by another component residing within or external to the e-commerce platform 100. In some embodiments, either or both of the applications 142A-B provide an 3D modeling engine that implements the functionality described herein to make it available to customers and/or to merchants. Furthermore, in some embodiments, the commerce management engine 136 provides that 3D modeling engine. However, the location of the 3D modeling engine 300 is implementation specific. In some implementations, the 3D modeling engine 300 is provided at least in part by an e-commerce platform, either as a core function of the e-commerce platform or as an application or service supported by or communicating with the e-commerce platform. Alternatively, the 3D modeling engine 300 may be implemented as a stand-alone service to clients, such as a customer device 150 or a merchant device 102. In addition, at least a portion of such a 3D modeling engine could be implemented in the merchant device 102 and/or in the customer device 150. For example, the merchant device 102 could store and run an 3D modeling engine locally as a software application.

As discussed in further detail below, the 3D modeling engine 300 could implement at least some of the functionality described herein. Although the embodiments described below may be implemented in association with an e-commerce platform, such as (but not limited to) the e-commerce platform 100, the embodiments described below are not limited to e-commerce platforms.

Example Systems and Methods for Generating and Modifying 3D Models

Figure 4:
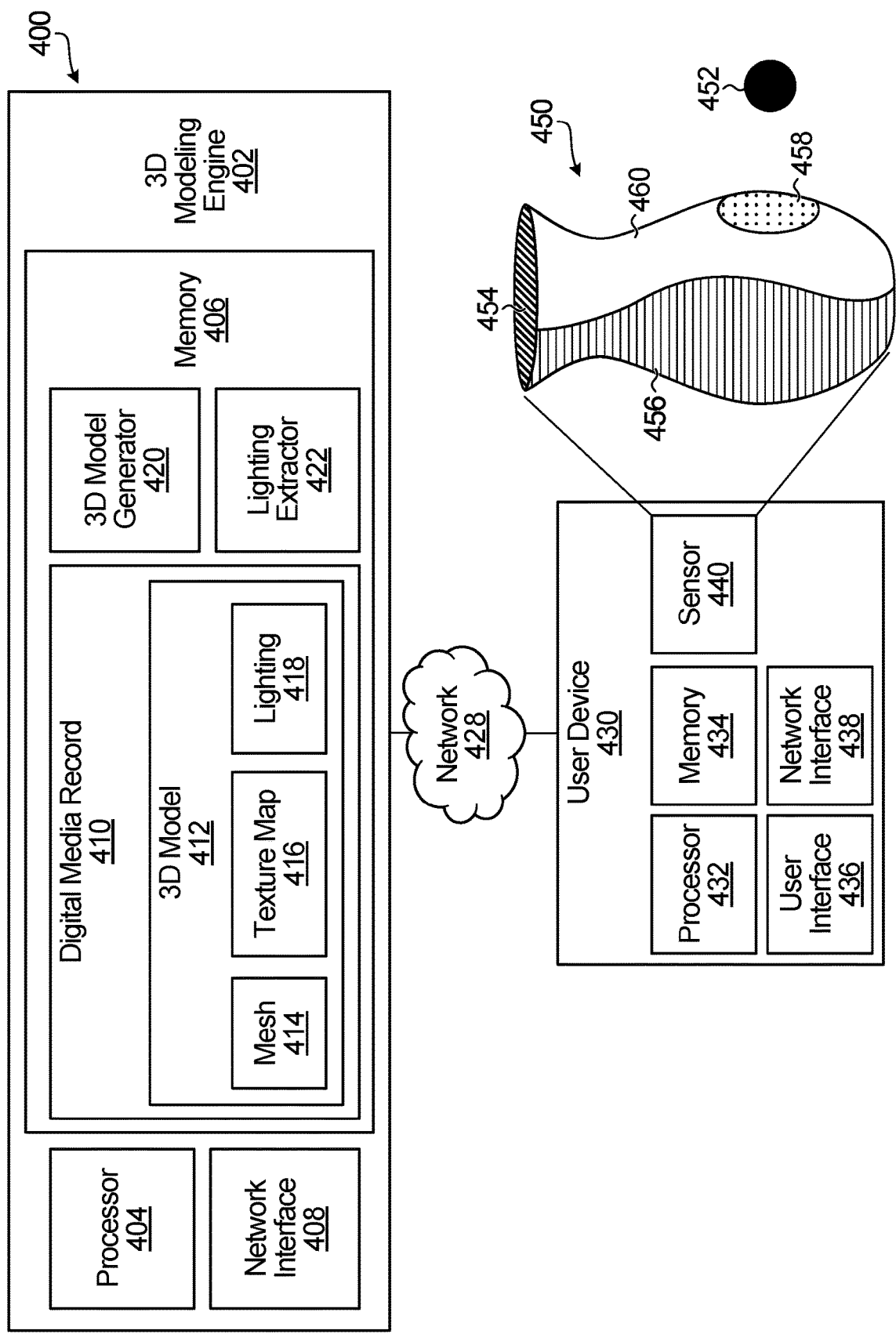
FIG. 4 is a block diagram illustrating a system for generating and modifying a 3D model, according to an embodiment.

FIG. 4 is a block diagram illustrating a system 400 for generating and modifying 3D models, according to an embodiment. The system 400 includes a 3D modeling engine 402, a network 428 and a user device 430.

The network 428 may be a computer network implementing wired and/or wireless connections between different devices, including the 3D modeling engine 402 and the user device 430. The network 428 may implement any communication protocol known in the art. Non-limiting examples of communication protocols include a local area network (LAN), a wireless LAN, an internet protocol (IP) network, and a cellular network.

The user device 430 may be or include a mobile phone, tablet, laptop, projector, headset and/or computer. The user device 430 may be, for example, a customer device that is owned and/or operated by a customer or be a merchant device that is owned and/or operated by a merchant. The user device 430 includes a processor 432, memory 434, user interface 436, network interface 438 and sensor 440.

The user interface 436 may include, for example, a display screen (which may be a touch screen), a gesture recognition system, a speaker, headphones, a microphone, haptics, a keyboard, and/or a mouse. The user interface 436 may present digital content to a user, including visual, haptic and audio content. In some implementations, the user device 430 includes implanted devices or wearable devices, such as a device embedded in clothing material, or a device that is worn by a user, such as glasses.

The network interface 438 is provided for communicating over the network 428. The structure of the network interface 438 will depend on how the user device 430 interfaces with the network 428. For example, if the user device 430 is a mobile phone, headset or tablet, then the network interface 438 may include a transmitter/receiver with an antenna to send and receive wireless transmissions to/from the network 428. If the user device is a personal computer connected to the network with a network cable, then the network interface 438 may include, for example, a network interface card (NIC), a computer port, and/or a network socket.

The processor 432 directly performs or instructs all of the operations performed by the user device 430. Examples of these operations include processing user inputs received from the user interface 436, preparing information for transmission over the network 428, processing data received over the network 428, and instructing a display screen to display information. The processor 432 may be implemented by one or more processors that execute instructions stored in the memory 434. Alternatively, some or all of the processor 432 may be implemented using dedicated circuitry, such as an application specific integrated circuit (ASIC), a graphics processing unit (GPU) or a programmed field programmable gate array (FPGA).

The sensor 440 may enable photography, videography, distance measurements, 3D scanning and/or 3D mapping (e.g., simultaneous localization and mapping (SLAM)) at the user device 430. For example, the sensor 440 may include one or more cameras, radar sensors, lidar sensors, sonar sensors, accelerometers, gyroscopes, magnetometers and/or satellite positioning system receivers (e.g., global positioning system (GPS) receivers). Although the sensor 440 is shown as a component of the user device 430, at least a portion of the sensor 440 may also or instead be implemented separately from the user device 430 and may communicate with the user device 430 via wired and/or wireless connections, for example.

In some implementations, measurements obtained by the sensor 440 may help generate digital media depicting physical objects. For example, a merchant may use the user device 430 to capture images, videos and/or 3D models of their products. Alternatively or additionally, measurements obtained by the sensor 440 may help map a real-world space. This might help to enable augmented reality (AR), mixed reality (XR) and/or extended reality (XR) experiences on the user device 430. In some implementations, an environment map may be generated from a series of real-world images (e.g., a video stream) of an environment that are combined to provide a cohesive digital representation of that environment. The images may be organized to form the interior surfaces of a sphere or cube depicting the environment, where the center of the sphere or cube corresponds to a location where the real-world images were captured. The environment map may depict the various surfaces within the environment that are visible from the location where the images were captured. Further, the environment map may capture various light sources in the environment, including the ambient light in the environment. For example, sunlight from a window may be represented by a bright area in a region of an environment map.

In the illustrated example, the sensor 440 is measuring a physical object 450 to generate digital media depicting the object 450. The object 450 is shown as a vase, but this is only an example. An image and/or video of the object 450 may be captured using a camera in the sensor 440. Alternatively or additionally, a 3D model of the object 450 may be generated using measurements collected by the sensor 440. For example, images, videos and/or 3D scans (e.g., from lidar, radar and/or sonar sensors) may be collected by the sensor 440 and used to generate the 3D model of the object 450. In some cases, the object 450 may be a product sold by a merchant and the digital media depicting the object 450 may be generated to present that product to customers.

The digital media for the object 450 may depict or otherwise represent the lighting of the object 450 in the real-world environment. As shown, the object 450 is lit by a real-world point light source 452, which could be a light bulb illuminating the object 450, for example. The object 450 is also lit by ambient lighting reflected from various surfaces in the environment surrounding the object 450 (e.g., the walls of the room where the object 450 is located). However, it should be noted that the lighting shown in FIG.

4 is only an example, and other types of light sources may also or instead be used to light the object 450.

The real-world lighting on the object 450 creates various light interactions on different portions of the object 450. Hatching is used to illustrate shadows cast on surfaces of the object 450 by the light source 452. Diagonal hatching illustrates a shadow cast in an interior portion 454 of the object 450, and horizontal hatching illustrates a shadow cast on an exterior portion 456 of the object 450 positioned opposite the light source 452. The portions 454, 456 of the object 450 might not reflect light directly from the light source 452, and might only include the ambient lighting from the surrounding environment. Stippling is used to illustrate specular lighting on an exterior portion 458 of the object 450 that is closest to the light source 452, where light from the light source 452 may be at a relatively high intensity. Finally, no shading is used to illustrate diffuse lighting from the light source 452 on another exterior portion 460 of the object facing the light source 452. Notably, although the foregoing are illustrated as discrete areas, this is for the purposes of illustration and, in at least some cases, the transition between different light interactions may be gradual and/or interactions of various types may overlap so that, for example, lighting from one source is superimposed on lighting from another source.

The various light interactions on the different portions 454, 456, 458, 460 of the object 450 may be depicted in digital media captured by the sensor 440. In some implementations, the light source 452 and/or the ambient lighting could be measured by the sensor 440 to simulate the real-world lighting in a 3D model of the object 450. For example, the sensor 440 could measure the properties of the light source 452 and the ambient lighting. Example properties of light sources are provided elsewhere herein. The sensor 440 may also or instead generate an environment map of the scene around the object 450, which may capture the light source 452 and the ambient lighting.

In some implementations, the digital media depicting the object 450 may include user-defined and/or computer-generated lighting of the object 450. For example, a 3D model of the object 450 may include virtual light sources that might not be intended to simulate the real-world lighting of the object 450.

A 3D model of the object 450 may be generated and/or modified using the 3D modeling engine 402 in the system 400. For example, the 3D modeling engine 402 may be used to generate and/or modify the 3D model based on measurements and/or other input from the user device 430. As illustrated, the 3D modeling engine 402 includes a processor 404, memory 406 and a network interface 408. The processor 404 may be implemented by one or more processors that execute instructions stored in the memory 406 or in another computer readable medium. Alternatively, some or all of the processor 404 may be implemented using dedicated circuitry, such as an ASIC, a GPU, or a programmed FPGA.

The network interface 408 is provided for communication over the network 428. The structure of the network interface 408 is implementation specific. For example, the network interface 408 may include a NIC, a computer port (e.g., a physical outlet to which a plug or cable connects), and/or a network socket.

The memory 406 stores a digital media record 410, a 3D model generator 420, and a lighting extractor 422. The digital media record 410 may include one or more instances of digital media, which may be stored for the purpose of generating and/or modifying 3D models at the 3D modeling engine 402. The digital media record 410 may include images, videos and/or 3D models depicting objects, and may also include associated audio content and/or haptic content. For example, the digital media record 410 could store sounds made by or otherwise associated with an object and/or haptic feedback that could provide the feel of an object.

At least some of the digital media in the digital media record 410 may be obtained from user devices. For example, digital media could be received from the user device 430 and stored in the digital media record 410. In some implementations, the digital media record 410 may pertain to products sold by one or more merchants. For example, the 3D modeling engine 402 may be associated with an e-commerce platform, similar to the 3D modeling engine 300 of FIG. 3. A merchant may generate digital media for any, one, some, or all of the products sold in their stores. This digital media may be provided directly to the 3D modeling engine 402 by the merchant, or the 3D modeling engine 402 may obtain the digital media from a merchant's account on an e-commerce platform and/or from the merchant's online store. Digital media may also be obtained from other platforms such as social media platforms, for example.

In some implementations, 3D models are generated locally at the 3D modeling engine 402 and stored in the digital media record 410. The 3D model generator 420 may include and/or implement one or more algorithms (possibly in the form of software instructions executable by the processor 404) to generate 3D models. Possible methods for generating 3D models include photogrammetry (e.g., creating a 3D model from a series of 2D images), 3D scanning (e.g., moving a 3D scanner around an object to capture all angles) and 3D digital sculpting. Alternatively or additionally, the 3D model generator 420 may include and/or implement one or more algorithms to modify 3D models stored in the digital media record 410.

The lighting extractor 422 may include and/or implement one or more algorithms (possibly in the form of software instructions executable by the processor 404) to characterize the lighting depicted in one or more instances of digital media. This digital media may be stored in the digital media record 410 and/or elsewhere. The lighting extractor 422 may determine a lighting template that represents the lighting of objects as depicted in the digital media, which may be extracted in any of a number of different ways and/or forms. In some implementations, the lighting template may be extracted as properties of one or more light sources that illuminate objects depicted in the digital media. In some implementations, a lighting template may be extracted as an environment map corresponding to the digital media. For example, the environment map may characterize the lighting in the environment in which the digital media was created.

As discussed in further detail elsewhere herein, the 3D model generator 420 may be used to apply a lighting template determined by the lighting extractor 422 to a 3D model of an object. Applying the lighting template may modify the 3D model to light the object according to the lighting template, which may help provide a consistent use of lighting across related digital media.

As shown in FIG. 4, the digital media record 410 at least temporarily stores a 3D model 412 of the object 450. The 3D model 412 may have been generated using the 3D model generator 420 or may have been generated by another device and transmitted to the 3D modeling engine 402. For example, the user device 430 may include a 3D model generator used to generate the 3D model 412. It should be noted that the 3D model of the object 450 includes a representation of the object 450 but is not limited to the object 450. The 3D model 412 may represent other objects and/or entities, including light sources and/or background objects, for example. As such, the phrase "3D model of X" does not limit the 3D model to only representing X.

The 3D model 412 provides a mathematical representation of the object 450 that is defined with a length, width, and height. The 3D model 412 may be defined within a 3D virtual coordinate system, which could be a cartesian coordinate system, a cylindrical coordinate system or a polar coordinate system, for example. The 3D model 412 includes a mesh 414 defining the shape of the object 450, a texture map 416 defining the surfaces of the object 450, and virtual lighting 418 representing real-world and/or computer-generated lighting conditions for the object 450.

The mesh 414 may include an interconnected set of vertices, edges and surfaces that reflect the shape of the object 450. In some implementations, measurements of the object 450 captured by the sensor 440 may be used to help generate the mesh 414. Analysis of the measurements may provide the relative positions of multiple feature points on the object 450. These feature points may correspond to patterns, features, structures, parts, or sites on the object 450. After determining the relative positions of the feature points, the mesh 414 may be generated by mapping the feature points to vertices in the virtual coordinate system and interconnecting the vertices to form virtual surfaces that simulate the physical surfaces of the object 450. The mesh 414 may also or instead be at least partially generated through user input at a user device. For example, the mesh 414 may be generated through manual placement and/or manipulation of the vertices and/or the virtual surfaces. The mesh 414 may be a polygonal mesh in some implementations; however, other types of meshes are also possible.

The texture map 416 may be a 2D image or other data structure representing the texture of the object 450. The texture map 416 may be mapped to the mesh 414 to provide an appearance (e.g., a color and/or a pattern) for the virtual surfaces defined by the mesh 414. Each pixel of the texture map 416 may correspond to, and provide detail for, a respective location on the virtual surfaces. At least a portion of the texture map 416 may be derived from measurements of the object 450. For example, the texture map 416 may include or be based on photographs and/or 3D scans of the object 450. The texture map 416 may also or instead be at least partially computer-generated through user input at a user device. In some implementations, the texture map 416 may be generated based on one or more material models that simulate the materials forming the surfaces of the object 450. For example, the texture map 416 may be segmented based on the different materials on the surfaces of the object 450, and a different material model may be used in the texture map 416 to define each of the different materials. Optionally, the texture map 416 may include 3D information for the surfaces of the object 450, such as a height map, for example. The height map may store surface elevation data to simulate bumps and wrinkles on the surfaces of the object 450. The height map may be used in bump mapping to simulate shadows on the surfaces of the object 450 and/or may be used in displacement mapping to simulate a 3D textured surface.

The lighting 418 defines the lighting conditions for the 3D model 312. The lighting 418 may provide object-oriented lighting and/or global illumination for the 3D model 412. Possible lighting models that may be used for simulating lighting in a 3D model include the Lambert model, the Phong illumination model, the Blinn-Phong illumination model, radiosity, ray tracing, beam tracing, cone tracing, path tracing, volumetric path tracing, Metropolis light transport, ambient occlusion, photon mapping, signed distance field and image-based lighting, for example. In some implementations, the lighting 418 is used to simulate the illumination of the mesh 414 when rendering the 3D model 412. This may include calculating the properties of light (e.g., the light color and/or intensity) that is incident on each virtual surface of the mesh 414. After determining the illumination on each virtual surface of the mesh 414, shading may be performed to calculate how each virtual surface appears as a result of that illumination. For example, shading may simulate light interactions on the virtual surfaces of the mesh 414. Shading of a virtual surface may be based on, inter alia, the material properties of the virtual surface, which may be defined by the texture map 416. For example, the texture map 416 may include material models that simulate how the different materials of the object 450 appear under different light intensity and/or color. These material models may include equations that define the diffuse, ambient and/or specular light interactions for the materials. Using the simulated illumination on a particular material, a material model for that material may output the appearance of the material. A bump map may further be used to simulate shadows on the virtual surfaces of the mesh 414. In this way, the lighting 418 may be used in conjunction with the mesh 414 and the texture map 416 to simulate the appearance of the object 450 in renders/renderings of the 3D model 412.

In some implementations, a light map may be determined based on the lighting 418 prior to rendering the 3D model 412. A lightmap is a precalculated representation of the illumination of a 3D object. A lightmap may be used to define the illumination of any, some, or all of the virtual surfaces of the mesh 414 based on the lighting 418. The light map may be stored with the texture map 416 and used to calculate surface shading when rendering the 3D model 412.

In some implementations, the lighting 418 represents, or is based on, the illumination of the object 450 in the real-world. For example, the lighting 418 may be based on the measured properties of the light source 452 and/or the measured properties of the ambient lighting that illuminate the object 450. The lighting 418 may represent the light source 452 and ambient lighting in any of a number of different ways. In some implementations, the lighting 418 may define virtual light sources that simulate the light source 452 and the ambient lighting. For example, a virtual light source may be based on the measured properties of the light source 452 and the position and orientation of the light source 452 relative to the surfaces or center of the object 450. The virtual light source and the mesh 414 may be defined within a common coordinate system of the 3D model 412. Alternatively or additionally, the lighting 418 may implement image-based lighting. For example, the lighting 418 may include an environment map of the environment around the object 450. The environment map may capture the light source 452 and the ambient lighting that illuminate the object 450. The environment map may be placed around the mesh 414 in the virtual coordinate system of the 3D model 412, and the lighting captured by the environment map may be projected onto the virtual surfaces of the mesh 414. The environment map may also enable the depiction of reflections (e.g., through reflection mapping) on the virtual surfaces of the mesh 414.

In some implementations, the lighting 418 may be at least partially computer-generated and might not represent the real-world lighting of the object 450 (e.g., the lighting 418 may not represent the light source 452 and/or the ambient lighting). This may be the case if the 3D model 412 is generated through 3D digital sculpting and/or generated through a colorless 3D scan (e.g., using lidar) that does not involve measurements of the real-world lighting. For example, user input at a user device may generate at least a portion of the lighting 418. Computer-generated lighting may include user-defined virtual light sources and/or a user-defined environment map. Alternatively or additionally, the computer-generated lighting may define emissive lighting from the virtual surfaces of the mesh 414 (e.g., self-luminous surfaces).

The lighting 418 may enable a user interacting with the 3D model 412 to alter the simulated light interactions in the 3D model 412. The mesh 414 may be movable relative to a virtual light source and/or an environment map, which might alter the illumination of the different virtual surfaces of the mesh 414 and result in changes to the light interactions on those virtual surfaces. For example, moving the mesh 414 relative to the virtual light source and/or the environment map in the virtual coordinate system may result in the generation of a new light map for the 3D model 412. However, the lighting 418 need not always define virtual light sources or an environment map that allow the light interactions on different virtual surfaces to change as the 3D model 412 is manipulated. In some implementations, the lighting 418 may be fixed for the different virtual surfaces of the mesh 414. For example, the lighting 418 might define a fixed light map for the 3D model 412. In these implementations, when a user moves the mesh 414 of the 3D model 412 within the virtual coordinate system, the illumination of each virtual surface of the mesh 414 may remain constant.

It should be noted that the lighting 418 need not always be included in the 3D model 412. The virtual surfaces of the mesh 414 might instead have a fixed appearance in the 3D model 412. For example, the texture map 416 might directly represent the color and illumination of the object 450. The texture map 416 may be generated from photographs of the object 450, and therefore reflect the lighting of the object 450 as depicted by those photographs.

Figure 5:
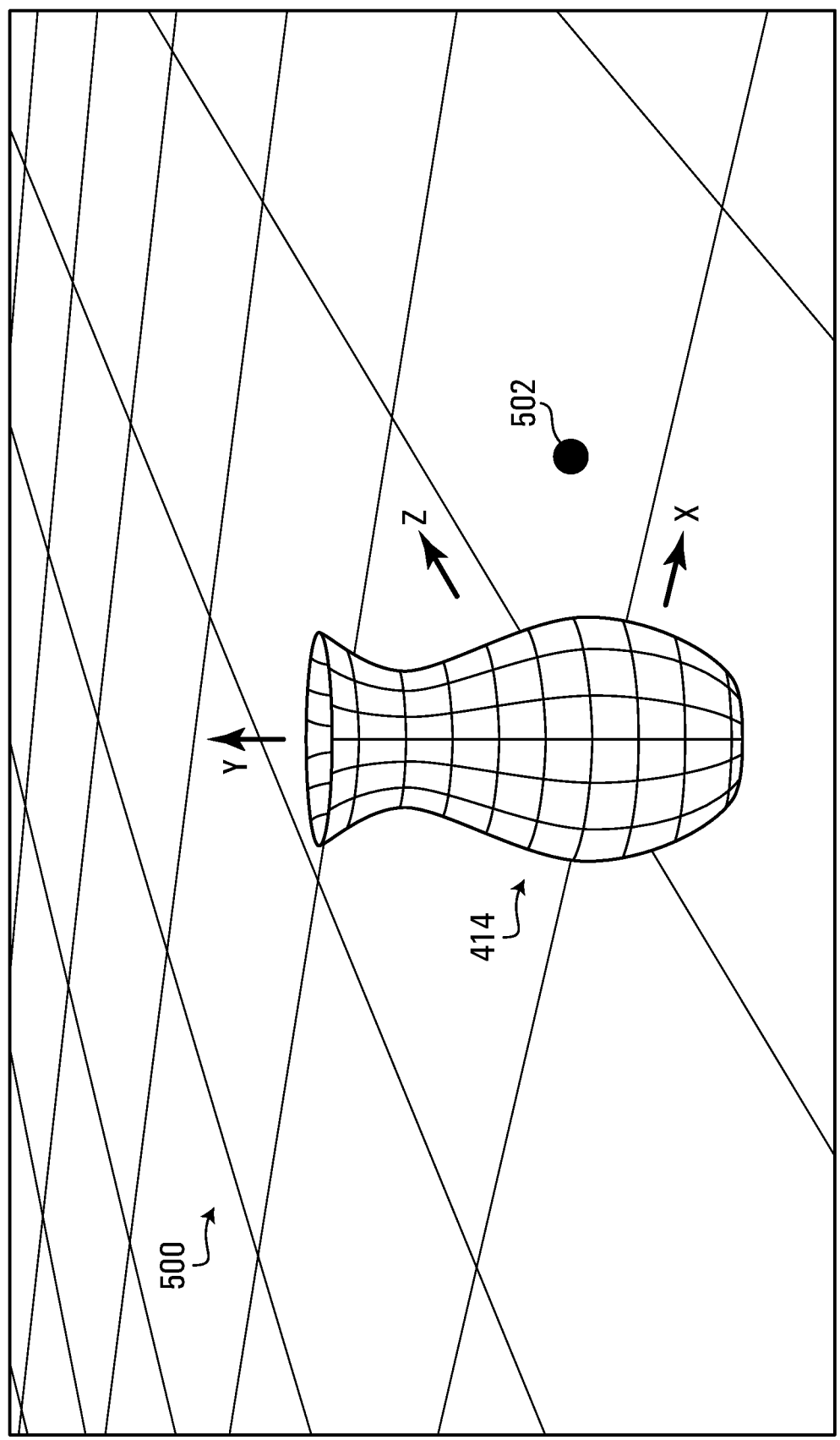
FIG. 5 illustrates a mesh and a virtual light source for the 3D model of FIG. 4, according to an embodiment.
Figure 6:
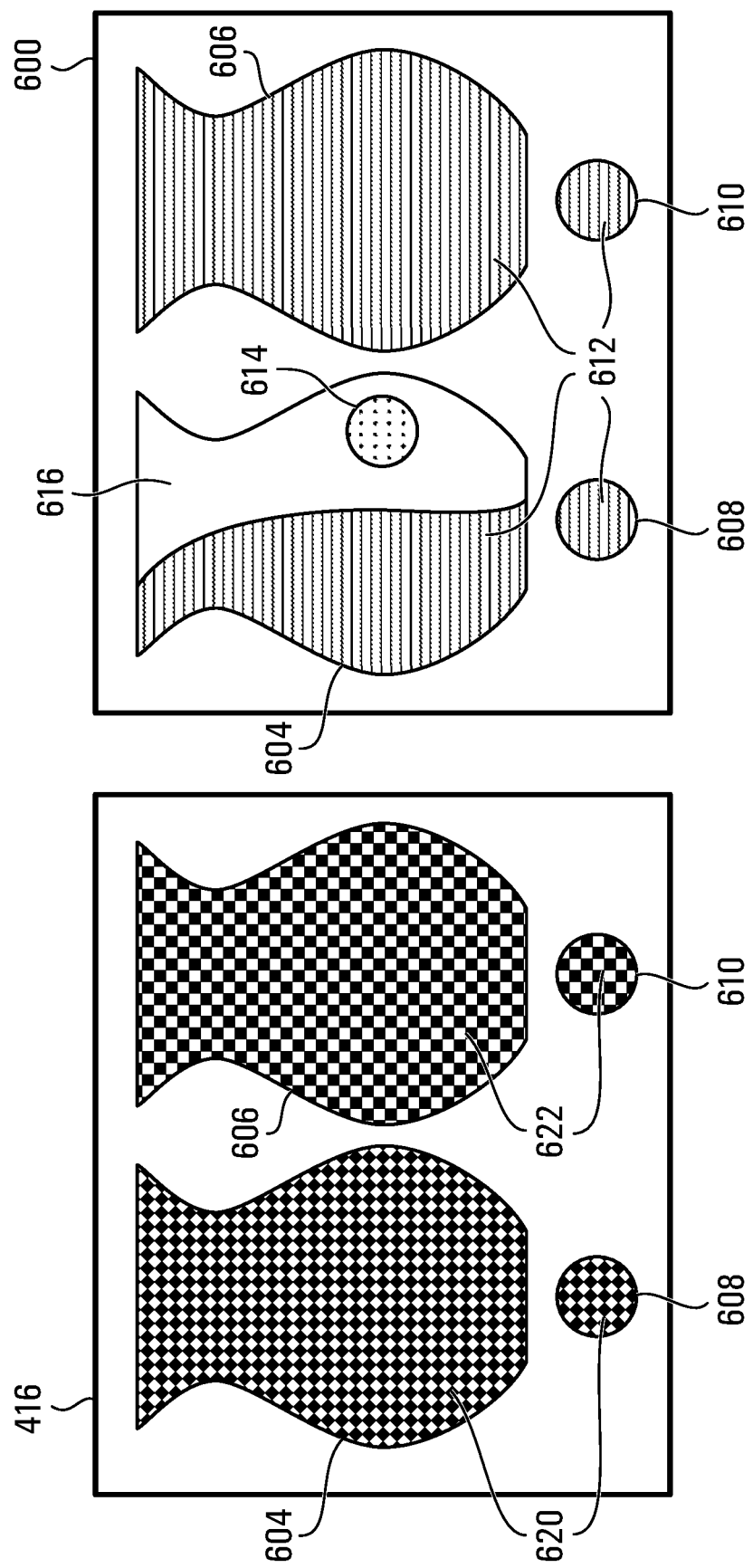
FIG. 6 illustrates a texture map and a light map for the 3D model of FIG. 4, according to an embodiment.

An example implementation of the 3D model 412 is illustrated in FIGS. 5 and 6. FIG. 5 illustrates the mesh 414 and a virtual light source 502 defined within a virtual coordinate system 500 of the 3D model 412, according to an embodiment. The mesh 414 generally provides the shape of the object 450. The light source 502 is defined by the lighting 418 in the 3D model 412 and simulates the real-world light source 452. For example, the properties of the light source 502 may be based on the measured or determined properties of the light source 452. The position of the light source 502 relative to the mesh 414 in the virtual coordinate system 500 may be consistent with the real-world position of the light source 452 relative to the object 450.

FIG. 6 illustrates the texture map 416 and a light map 600 for the 3D model 412, according to an embodiment. The texture map 416 includes an area 604 representing the exterior sidewall of the object 450 (including the exterior portions 456, 458, 460 of the object 450 shown in FIG. 4), an area 606 representing the interior sidewall of the object 450 (including the interior portion 454 of the object 450 shown in FIG. 4), an area 608 representing the exterior bottom surface of the object 450 and an area 610 representing an interior bottom surface of the object 450. The areas 604, 608 correspond to a material 620 (shown using diamond checkerboard) on the exterior surfaces of the object 450, and the areas 606, 610 correspond to another material 622 (shown using square checkerboard) on the interior surfaces of the object 450. For example, the exterior of the object 450 may be painted or coated with the material 620, which is not added to the interior. As such, the exterior and interior surfaces of the object 450 may have different material properties. The texture map 416 may define the materials 620, 622 using respective material models. For example, the areas 604, 608 may include a label or identifier that associates these areas 604, 608 with a material model for the material 620.

The light map 600 represents the simulated lighting conditions for the object 450, as defined by the lighting 418. The light map 600 may be calculated (e.g., during a baking process for the 3D model 412) based on the properties of the light source 502 and ambient lighting, for example. The light map 600 identifies areas 612 of the mesh 414 (shown using horizontal hashing) that are not illuminated by the light source 502 and might only be illuminated by the ambient lighting. The light map 600 also identifies an area 614 of the mesh 414 (shown using stippling) corresponding to high-intensity illumination by the light source 502, where the light source 502 is closest to the mesh 414. The light map 600 further identifies an area 616 of the mesh 414 (shown without shading) corresponding to low to moderate-intensity illumination by the light source 502. While the areas 612, 614, 616 of the light map 600 are shown as discrete, there may, in at least some cases, be overlapping light interactions and/or more gradual transitions therebetween.

The mesh 414, the texture map 416 and the light map 600 of the 3D model 412 may help reflect the appearance of the object 450 shown in FIG. 4. For example, the texture map 416 and the light map 600 may be used to calculate the light interactions for the virtual surfaces of the mesh 414 when rendering the 3D model 412.

It should be noted that the 3D model 412 is provided by way of example only. Other implementations of 3D models are also contemplated. The mesh 414, texture map 416 and light map 600 are shown in FIGS. 5 and 6 for illustrative purposes and greater clarity and should not be considered limiting. For example, a 3D model may not include a mesh, a texture map and/or a light map in some implementations. Further, it should be noted that the 3D model 412 is provided only as an example of digital media that may be stored in the digital media record 410. The digital media record 410 is in no way limited to the 3D model 412.

In some embodiments, the 3D modeling engine 402 could be implemented to modify the lighting 418 in the 3D model 412. This modification may be performed for any of a number of different reasons. By way of example, the modification may be performed to provide consistency between the 3D model 412 and other digital media that depicts the object 450 and/or a related object. Consider a case in which the object 450 is a product sold by a merchant of an online store. The merchant may already be presenting images and/or videos of the object 450 in their online store and may have generated the 3D model 412 in order to provide a 3D representation of the object 450. The images/videos may depict the object 450 using a lighting template that differs from the lighting 418 used in the 3D model 412, and the merchant may wish to modify the lighting 418 based on the lighting template. Alternatively or additionally, the merchant may wish to modify the lighting 418 to provide consistency with a lighting template used in digital media depicting other products sold through the online store.

Figure 7:
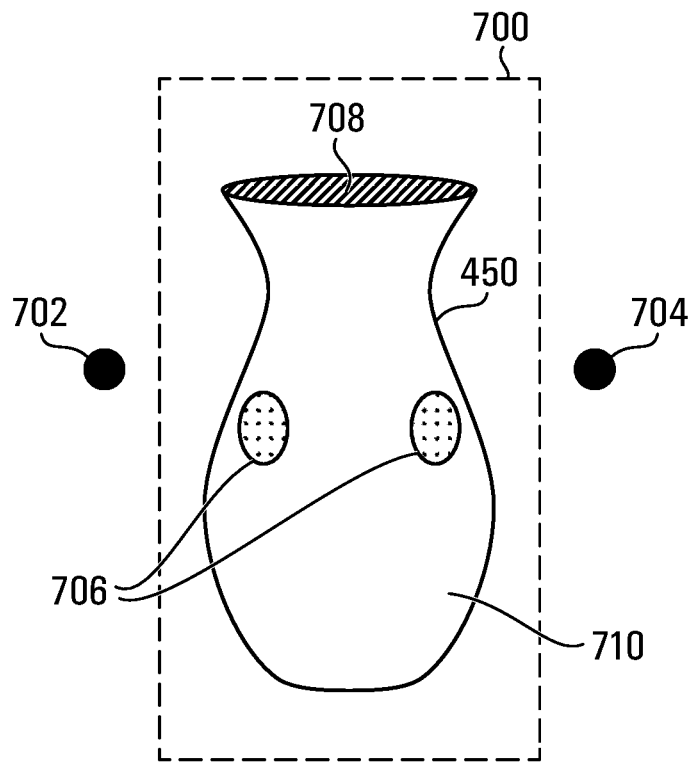
FIGS. 7 and 8 illustrate examples of digital media that may be used to obtain a lighting template for the 3D model of FIG. 4, according to some embodiments.
Figure 8:
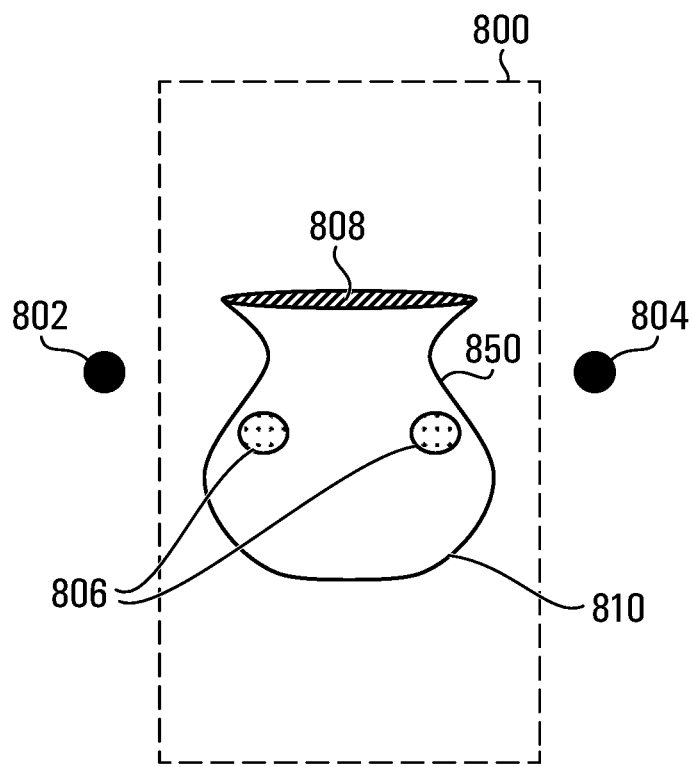

FIGS. 7 and 8 illustrate examples of digital media that may be stored in the digital media record 410 and may be used to obtain a lighting template for the 3D model 412. FIG. 7 illustrates digital media 700 depicting the object 450 being illuminated by two real-life point light sources 702, 704. The digital media 700 may be an image, a video and/or a 3D model of the object 450, for example. As illustrated using a dashed box in FIG. 7, the digital media 700 captures the object 450 but does not capture the light sources 702, 704. However, light interactions on the surfaces of the object 450 are visible in the digital media 700. Two exterior portions 706 of the object 450 include specular lighting (shown using stippling) from the light sources 702, 704. The remaining exterior portion 710 of the object 450 includes diffuse lighting (shown without shading) from the light sources 702, 704. An interior portion 708 of the object 450 includes shadows (shown using diagonal hatching) cast from the light sources 702, 704. The interior portion 708 might only include ambient lighting from the surrounding environment.

The digital media 700 may be associated with the 3D model 412 because both the digital media 700 and the 3D model 412 represent the object 450. In some cases, the digital media 700 and the 3D model 412 might both represent the exact same object 450. However, in other cases, the object 450 shown in FIG. 7 might not be the exact same object 450 shown in FIG. 4. Instead, the digital media 700 and the 3D model 412 may depict different objects corresponding to the same product. For example, FIGS. 4 and 7 might show different items and/or variants of the same product.

FIG. 8 illustrates digital media 800 depicting an object 850 being illuminated by two real-life point light sources 802, 804. The object 850 is different from the object 450 of FIGS. 4 and 7. For example, the object 850 is shown as a vase with a size and shape that differs from the object 450. The materials of the object 850 may also or instead be different from the materials of the object 450. However, the objects 450, 850 may be related. For example, the objects 450, 850 may both correspond to products that are sold by a particular merchant. Further, the objects 450, 850 may correspond to the same collection of products sold by the merchant, such as the merchant's "Vase Collection", for example. In this way, the digital media 800 is associated with the 3D model 412. Further, the 3D model 412 and the digital media 700, 800 may all be considered related digital media.

The digital media 800 may be an image, video and/or 3D model, for example. As illustrated using a dashed box in FIG. 8, the digital media 800 captures the object 850 but does not capture the light sources 802, 804. Various light interactions from the light sources 802, 804 on the object 850 are depicted in the digital media 800. Specular lighting (shown using stippling) from the light sources 802, 804 is depicted on two exterior portions 806 of the object 850, and diffuse lighting (shown without shading) is depicted on the remaining exterior portion 810 of the object 850. An interior portion 808 of the object 850 includes shadows (shown using diagonal hatching) cast from the light sources 802, 804, and might only include ambient lighting from the surrounding environment.

The lighting depicted in the digital media 700, 800 may be similar. For example, the positions of the light sources 702, 704 relative to the object 450 in the digital media 700 may be similar to the positions of the light sources 802, 804 relative to the object 850 in the digital media 800. Further, the properties of the light sources 702, 704 may be similar to those of the light sources 802, 804. In some implementations, the digital media 700, 800 may both be captured using studio lighting, optionally at the same location and/or in the same session. In this way, the digital media 700, 800 may represent a single lighting template.

On the other hand, the lighting depicted in the digital media 700, 800 may significantly differ from the lighting 418 in the 3D model 412. For example, two point light sources 702, 704 illuminate the object 450 in the digital media 700, whereas only one point light source 502 might illuminate the mesh 414 in the 3D model 412. The lighting 418 of the 3D model 412 may be considered suboptimal because the light source 502 only illuminates one side of the mesh 414. Further, the position of the light source 502 relative to the mesh 414 in the 3D model 412 may differ from the positions of the light sources 702, 704 relative to the object 450 as depicted in the digital media 700. The light source 502 may also or instead have other properties that differ from the light sources 702, 704. Similar comments apply to the lighting depicted in the digital media 800.

The lighting differences between the 3D model 412 and the digital media 700, 800 may have been produced in any of a number of different ways. In some implementations, the 3D model 412 may be generated through photogrammetry using images or a video of the object 450 captured in real-world lighting that differs from the lighting used in the digital media 700, 800. For example, the 3D model 412 may be created from a video scan captured at a user's home, whereas the digital media 700, 800 may have been captured at a professional studio. Alternatively or additionally, the 3D model 412 may be generated through 3D digital sculpting and/or from a colorless 3D scan (e.g., a lidar scan), and include user-defined lighting.

As a result of the differences in lighting between the 3D model 412 and the digital media 700, 800, the 3D model 412 may appear inconsistent with the digital media 700, 800. This may be undesirable in applications where consistency across digital media is important, such as in digital product media for e-commerce, for example. The digital media 700, 800 may be used to advertise the objects 450, 850 for sale in a merchant's online store. The digital media 700, 800 may include certain lighting conditions that the merchant prefers and wants to recreate. For example, the digital media 700, 800 may include photographs that present the objects 450, 850 in an appealing way, and the merchant may want to apply the lighting conditions to other digital product media. Accordingly, a lighting template may be determined based on the digital media 700, 800 and used to generate a modified version of the 3D model 412 with lighting that is consistent with the digital media 700, 800.

Figure 9:
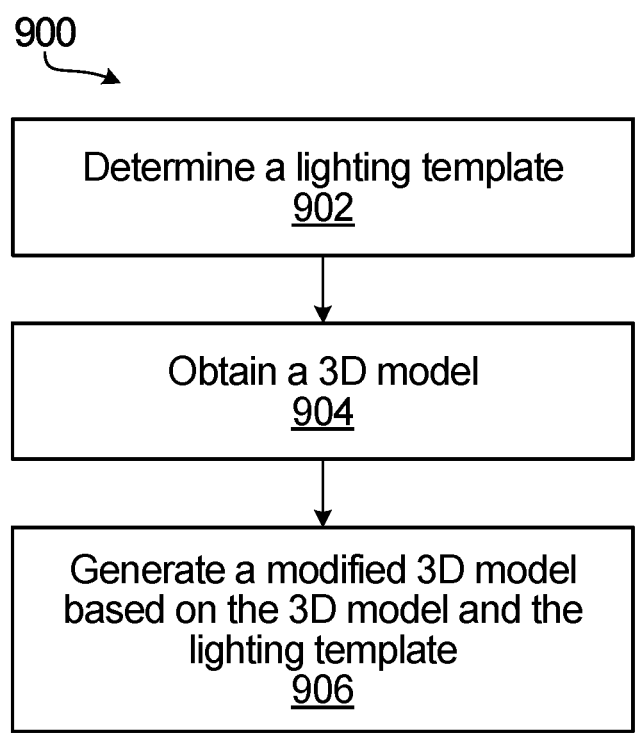
FIG. 9 is a flow diagram illustrating a method for modifying the lighting of a 3D model, according to an embodiment.

FIG. 9 is a flow diagram illustrating a method 900 for modifying the lighting of a 3D model, according to an embodiment. The method 900 will be described as being performed by the 3D modeling engine 402 of FIG. 4 to modify the lighting 418 in the 3D model 412, where the lighting 418 is modified based on the digital media 700, 800 of FIGS. 7 and 8. For example, the memory 406 may store instructions which, when executed by the processor 404, cause the processor 404 to perform the method 900. However, this is only one example implementation of the method 900. The method 900 may be more generally applied to modify the lighting of other 3D models based on other digital media. The method 900 also need not always be performed by a 3D modeling engine and might instead be performed by another device such as a user device, for example.

Step 902 includes the processor 404 determining a lighting template based on the digital media 700 and/or the digital media 800. This may also be considered extracting the lighting depicted in the digital media 700, 800. The lighting template may represent the lighting of the object 450 as depicted in the digital media 700 and/or represent the lighting of the object 850 as depicted in the digital media 800. In some implementations, the digital media 700, 800 may be obtained from the digital media record 410 and may be input into the lighting extractor 422 to determine the lighting template. Once determined, the lighting template may be stored in the memory 406.

In some implementations, step 902 includes determining the properties of one or more light sources depicted in the digital media 700, 800. These properties may then form at least a portion of the lighting template. For example, step 902 may include determining the properties of any, one, some, or all of the light sources 702, 704, 802, 804 and/or the ambient lighting depicted in the digital media 700, 800. The properties of a light source may include a type of light source (e.g., point light source, directional light source, spotlight, ambient light, exc.). Alternatively or additionally, the properties of a light source may include the position and/or orientation of the light source relative to one of the objects 450, 850, as depicted in the digital media 700, 800. The position and/or orientation of a light source may be measured in relation to the surfaces or centres of the objects 450, 850, for example. Other properties of a light source that may be determined in step 902 include, inter alia, the brightness or intensity of the light source, the color of the light source, the directionality of the light source and/or the spread of the light source.

The properties of light sources may be extracted from digital media in any of a number of different ways. In some implementations, the light interactions depicted in the digital media 700, 800 may be analyzed to determine the light sources that may have produced those interactions. For example, the diffuse, ambient and/or specular light interactions shown on the different portions 706, 708, 710 of the object 450 in the digital media 700 may be used to determine the properties of the light sources 702, 704. Similarly, the diffuse, ambient and/or specular light interactions shown on the different portions 806, 808, 810 of the object 850 in the digital media 800 may be used to determine the properties of the light sources. Reflections on surfaces of the objects 450, 850 may also or instead be used to determine the properties of the light sources. If the materials of either or both of the objects 450, 850 are known (or can be estimated), then the light interactions shown on the objects 450, 850 may be used to characterize the corresponding light sources. The light interactions may be extracted from the digital media 700, 800 through image analysis, for example, and compared to known material properties for the objects 450, 850 to determine which light sources may have produced those light interactions.

Light interactions depicted in the digital media 700, 800 on surfaces that are separate from the objects 450, 850 may also or instead be used to determine the properties of light sources in step 902. For example, the walls of a room and/or surfaces of background objects shown in the digital media 700, 800 may depict light interactions that may be used to extract properties of light sources. The material properties of these walls and/or surfaces may be known (or may be estimated) and may be used to help determine the properties of light sources through image analysis, for example.

In some implementations, step 902 includes determining an environment map for an environment containing the object 450 and/or the object 850. The environment map may then form at least part of the lighting template. An environment map may be produced by performing image analysis on the digital media 700, 800. For example, background content depicted in the digital media 700 may be extracted to form an environment map, which may at least partially recreate the environment or scene in which the digital media 700 was generated. Background content may be any portion of the digital media 700 that does not depict the object 450. Alternatively or additionally, the light interactions depicted on the different portions 706, 708, 710 of the object 450 in the digital media 700 and knowledge of the object's material properties may be used to help determine at least a portion of the environment map (e.g., locate blobs of light and/or dark areas in the environment based on light interactions on the object 450). The position of the object 450 within the environment map may be determined and stored as coordinates. For example, a coordinate system may be mapped to the environment map, and the object 450 may be assigned a position and orientation within the coordinate system. Similar comments apply to creating an environment map based on the digital media 800.

If the digital media 700, 800 and/or other digital media were captured in the same environment (e.g., multiple photographs were taken at different angles in the same room), then an environment map may be generated based on multiple instances of digital media. For example, background content extracted from the multiple instances of digital media may be stitched together to help form the environment map.

Alternatively or additionally, an environment map may be created in a mapping process that is separate from capturing the digital media 700, 800, and optionally stored as metadata with the digital media 700, 800. For example, before, during, or after capturing the digital media 700 in a room, a user may perform a 360° scan of the room to create an environment map. The environment map may then be stored as metadata attached to the digital media 700 and obtained in step 902 to determine the lighting template.

In some implementations, the lighting in the digital media 700 may differ from the lighting in the digital media 800. For example, the properties of the light sources 702, 704 may differ from the properties of the light sources 802, 804. Alternatively or additionally, the depicted location of the light sources 702, 704 relative to the object 450 in the digital media 700 may differ from the depicted location of the light sources 802, 804 relative to the object 850 in the digital media 800. Further, the ambient lighting depicted in the digital media 700, 800 may differ. Step 902 may include summing and optionally averaging the different lighting depicted in the digital media 700, 800 to determine a single lighting template. In this way, the lighting template may represent the lighting in both instances of the digital media 700, 800, but might not exactly match the lighting in either instance.

Consider, by way of example, the case in which the lighting template determined in step 902 includes the properties of the light sources 702, 704, 802, 804. Averaging the properties of the light sources 702, 704, 802, 804 may include averaging the brightness of the light sources 702, 704, 802, 804. For example, the lighting template may include properties of each of the light sources 702, 704, 802, 804, but with the brightness of each light source divided by two (i.e., the number of instances of digital media 700, 800) to provide a single set of light sources that represent an average of the lighting depicted in the digital media 700, 800. Averaging the properties of the light sources 702, 704, 802, 804 may also or instead include averaging the position of two or more of the light sources 702, 704, 802, 804. If it is determined that the light sources 702, 802 have a similar type, brightness and/or color, but different locations relative to the respective objects 450, 850, then the lighting template may include an average of the positions of the light sources

702, 802. For example, the digital media 700, 800 may have been created in a studio under the same lighting, but the positions of the light sources 702, 802 may differ in the respective digital media 700, 800 due to a different position of the objects 450, 850 in the studio and/or due to a different position of a camera capturing the digital media 700, 800.

In the case that the lighting template includes a different environment map for each instance of the digital media 700, 800, the different environment maps may be multiplied, blended or otherwise summed to form a single composite environment map. For example, the environment maps may be analysed to determine the location of similar features (e.g., the location of the light sources 702, 802) and then blended such that the similar features overlap in the composite environment map.

It should be noted that step 902 is not limited to being based on the digital media 700, 800. The lighting template may also or instead be based on other digital media. In general, step 902 may include determining, based on one or more instances of digital media depicting one or more objects, a lighting template representing lighting of the one or more objects as depicted in the digital media. The instances of digital media may include at least one of an image, a video or a 3D model.

Step 904 includes the processor 404 obtaining the 3D model 412 of the object 450. The 3D model 412 may be obtained from the digital media record 410, but more generally may be obtained from any computer readable storage medium and/or device. As noted above, the lighting 418 in the 3D model 412 may be in some way inconsistent with the lighting template determined in step 902, and therefore a user may wish to apply the lighting template to the 3D model 412.

Step 906 includes the processor 404 generating, based on the 3D model 412 and the lighting template determined in step 902, a modified 3D model of the object 450 lit according to the lighting template. In some implementations, step 906 is performed by the 3D model generator 420. For example, the 3D model generator 420 may accept the 3D model 412 and the lighting template as inputs, modify the lighting 418 and/or the texture map 416 of the 3D model 412 based on the lighting template, and output a modified 3D model that includes the object 450 lit according to the lighting template. The modified 3D model may then be stored in the digital media record 410 and/or be transmitted to another system or device. For example, the modified 3D model may be transmitted to a system hosting an online store to present the object 450 to customers. The modified 3D model may be provided on a page of the online store that also includes the digital media 700, 800. When renders of the modified 3D model are generated and displayed on the page, the object 450 may appear to be illuminated with the same lighting used in the digital media 700, 800, thereby providing consistent product lighting on the page.

In some implementations, step 906 includes normalizing the lighting of the object 450 as depicted in the 3D model 412 to obtain normalized lighting for the 3D model 412. For example, the texture map 416 and/or the lighting 418 may be normalized before applying the lighting template to the 3D model 412. This normalization may be useful if, for example, the 3D model 412 was generated using images of the object 450 and/or its surrounding environment under substandard lighting conditions. The 3D model 412 may be modified to help remove the effects of the substandard lighting conditions and allow the lighting template to be accurately recreated in the modified 3D model. In some implementations, normalizing the lighting 418 may include deleting or removing at least a portion of the lighting 418 from the 3D model 412. This may provide an unlit 3D model of the object 450 that the lighting template may be added to. Alternatively or additionally, normalizing the lighting 418 may include modifying the lighting 418 to provide uniform or standard lighting (e.g., lightbox lighting) for the 3D model 412. Adding the lighting template to this uniform or standard lighting may include removing some of the lighting to create shadows, for example, in the modified 3D model.

In some implementations, lighting depicted in the texture map 416 is modified and/or removed during normalization, optionally to depict uniform or standard lighting in the texture map 416. For example, if the texture map 416 was created based on photographs taken under substandard lighting conditions, then the texture map 416 may be modified to remove the substandard lighting conditions.

The 3D model 412 may be modified based on the lighting template in any of a number of different ways, which may depend on how the lighting template was determined in step 902. In some implementations, step 906 includes adding at least one virtual light source to the 3D model 412 to produce the modified 3D model. The properties of this virtual light source may be defined by the lighting template. Adding a virtual light source to the 3D model 412 may include placing the virtual light source within the virtual coordinate system of the 3D model 412. The modified 3D model may then simulate light from the virtual light source on the virtual surfaces of the mesh 414 when rendering the modified 3D model. The illumination of the virtual surfaces of the mesh 414 may include reflections off other virtual surfaces in the modified 3D model. Examples of simulating lighting in a 3D model are provided elsewhere herein. In some implementations, adding a virtual light source to the 3D model 412 may result in the generation of a new light map for the modified 3D model.

The properties of a virtual light source added to the 3D model 412 may be based on the properties of a light source determined in step 902. For example, if the properties of any, one, some, or all of the light sources 702, 704, 802, 804 are determined in step 902, then one or more virtual light sources with corresponding properties may be added to the 3D model 412. Different types of virtual light sources may be added to the 3D model 412 based on the types of light sources depicted in the digital media 700, 800. By way of example, if one of the light sources 702, 704, 802, 804 is determined to be a point light source in step 902, then a virtual point light source may be added to the 3D model 412. A virtual ambient light source may also or instead be added to the 3D model 412 based on ambient lighting in the digital media 700, 800.

Alternatively or additionally, a virtual light source may be added to the 3D model 412 at a virtual position and orientation that is consistent with a light source depicted in the digital media 700, 800. For example, a virtual light source may be placed within a virtual coordinate system of the 3D model 412 at a position that is based on the position of one or more of the light sources 702, 704, 802, 804 relative to one or more the objects 450, 850, as depicted in the digital media 700, 800. The position and orientation of the virtual light source may be measured relative to the surfaces or center of the mesh 414. In this way, if a virtual light source is based on the properties of the light source 702, then the position and orientation of the virtual light source relative to the mesh 414 may represent the position of the light source 702 relative to the object 450 in the digital media 700.

In some implementations, step 906 includes applying an environment map to the 3D model 412 to produce the modified 3D model. For example, if at least a portion of the lighting template is in the form of an environment map, then the environment map may be added to the 3D model 412. The environment map may be added to the 3D model 412 at a position and orientation that is based on the position and/or orientation of one or both of the objects 450, 850 within their environments, as depicted in the digital media 700, 800. The environment map may be implemented to perform image-based lighting for the modified 3D model. For example, when rendering the modified 3D model, the lighting captured by the environment map may be projected onto the virtual surfaces of the mesh 414. This may result in the generation of a new light map for the modified 3D model. By way of example, natural light from a window in an environment map may be mapped to a virtual surface of the mesh 414 facing that window to realistically brighten that virtual surface. Any reflective surfaces on the mesh 414, as defined by the texture map 416, may also depict reflections from the environment map.

In some implementations, step 906 includes modifying the texture map 416 of the 3D model 412 based on the lighting template. The texture map 416 may be modified to include a light map generated according to the light template, for example. The texture map 416 may also or instead be modified to include material models that define the materials of the object 450, to more realistically portray the lighting template on those materials. For example, if the texture map 416 does not include accurate material models for the object 450, then it might not be possible to simulate realistic light interactions on the object 450 using the texture map 416. Modifying the texture map 416 to include accurate material models may help better represent the lighting template in the modified 3D model. Alternatively or additionally, modifying the texture map 416 may be performed to depict at least a portion of the lighting template. For example, pixels values in the texture map 416 may be brightened or darkened according to the lighting template.

It should be noted that the order of steps 902, 904, 906 in FIG. 9 is shown by way of example. Other orders of steps 902, 904, 906 are also contemplated. In some implementations, steps 902, 906 are performed in conjunction. The 3D model 412 obtained in step 904 may be modified to include new lighting in step 906, and then the modified 3D model could be compared to the digital media 700 to determine if the new lighting matches the lighting depicted in the digital media 700. For example, a render of the modified 3D model may be generated based on the perspective of the object 450 as depicted in the digital media 700, and the render may be compared to the digital media 700 through image analysis. If the render substantially matches the digital media 700, then the new lighting used in the modified 3D model may be considered to be similar to the lighting depicted in the digital media 700. This may indicate that the modified 3D model includes a lighting template representing the lighting in the digital media 700. In this way, step 902 may include comparing the modified 3D model to the digital media 700 and determining, based on the comparison, that the modified 3D model matches the digital media 700. The match may not be an exact match, but might instead be a match within a defined threshold, for example. Responsive to determining that the modified 3D model matches the digital media, step 902 may then include determining that the modified 3D model includes the lighting template.

Alternatively, if the render of the modified 3D model significantly differs from the digital media 700, then the 3D model 412 may be modified again using different lighting. The 3D model may be modified multiple times, using different lighting each time, to generate multiple different modified 3D models. Each modified 3D model may be compared to the digital media 700 until one modified 3D model is found that matches the digital media 700. In this way, step 902 may include multiple iterations of generating a respective modified 3D model based on the 3D model 412 and a respective lighting template and comparing the respective modified 3D model to the digital media 700. This may be considered a trial-and-error approach to determining the lighting template in step 902. Optimization and/or regression algorithms may be applied to more quickly arrive at a lighting template that matches the lighting template depicted in the digital media 700.

While steps 904, 906 relate to obtaining the 3D model 412 and generating a modified version of the 3D model 412, this is only an example. Other 3D models depicting other objects (e.g., objects other than vases) may be obtained and modified in some implementations of steps 904, 906. For example, the lighting template determined in step 902 may represent standard lighting conditions used by a merchant, and steps 904, 906 could be performed for any, some, or all of the 3D models representing the merchant's products.

Figure 10:
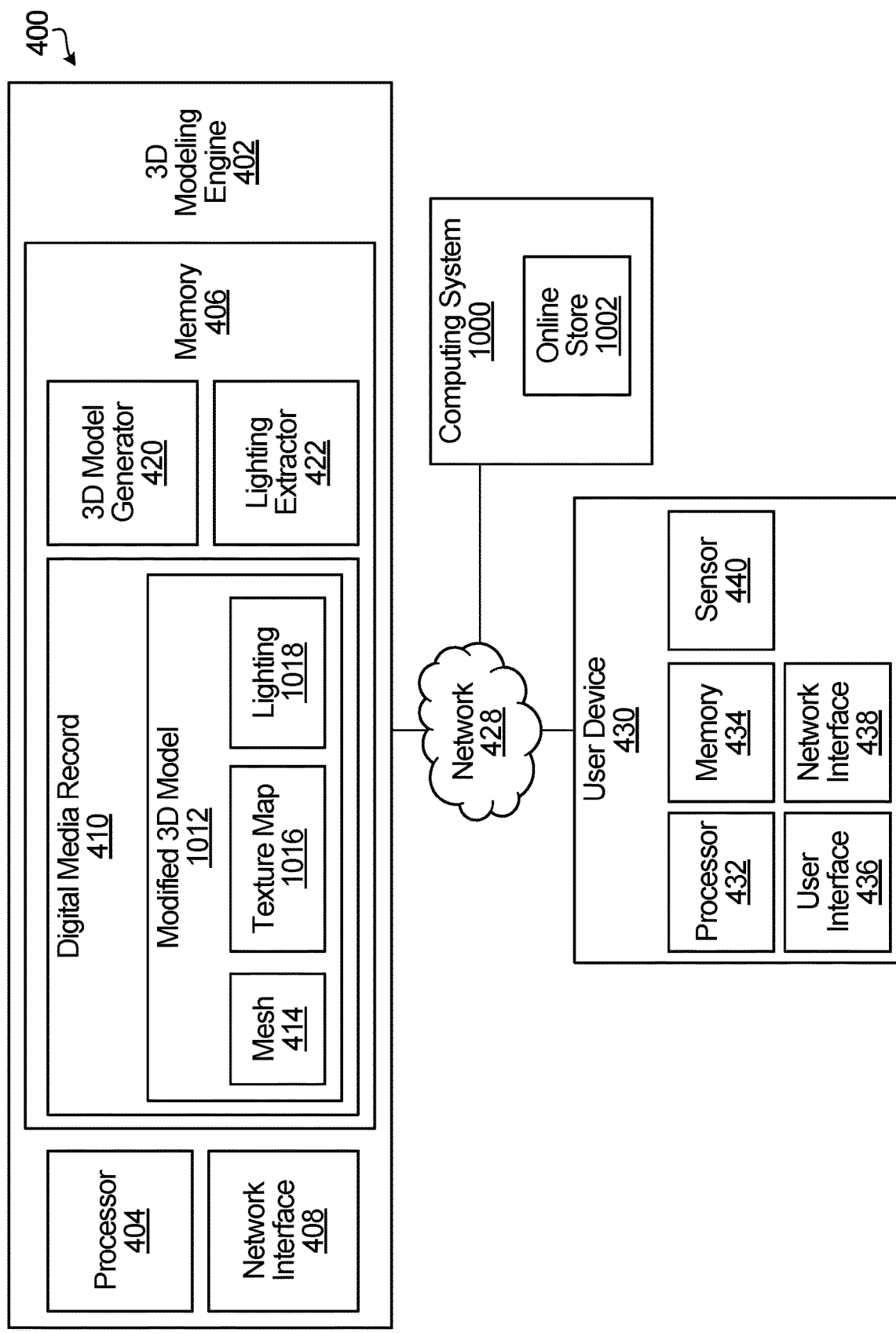
FIG. 10 is a block diagram illustrating the system of FIG. 4, but with a modified 3D model.

FIG. 10 is a block diagram illustrating the system 400 of FIG. 4, but with a modified 3D model 1012 stored in the digital media record 410. The modified 3D model 1012 may have been generated in step 906 of the method 900 based on the lighting template determined in step 902 and on the 3D model 412. It should be noted that the 3D model 412 may also be stored in the digital media record 410 in FIG. 10, but this is not illustrated in order to avoid congestion of the figure.

The modified 3D model 1012 includes the same mesh 414 as the 3D model 412. In this way, the shape of the modified 3D model 1012 may match that of the 3D model 412. However, in other embodiments, a different mesh may be implemented on the modified 3D model 1012. The modified 3D model 1012 also includes a texture map 1016 and virtual lighting 1018, which may be different from the texture map 416 and the lighting 418 of the 3D model 412. The texture map 1016 may have been generated in step 906 by normalizing lighting depicted in the texture map 416, by adding a new light map to the texture map 416, and/or by adding a new material model to the texture map 416, for example. The lighting 1018 may have been generated based on the lighting template in step 906. For example, the lighting 1018 may define one or more virtual light sources and/or an environment map defined by the lighting template.

The modified 3D model 1012 may be transmitted from the 3D modeling engine 402 to another system and/or device. In some implementations, the modified 3D model 1012 may be transmitted to a user device 430. For example, the user device 430 may have instructed the generation of the modified 3D model 1012 at the 3D modeling engine 402, and the modified 3D model 1012 may be transmitted to the user device 430 in response to the instruction. Alternatively or additionally, the modified 3D model 1012 may be transmitted to a computing system 1000 in the system 400. For example, the modified 3D model 1012 may be transmitted to the computing system 1000 for presentation in an online store 1002 supported, hosted, or otherwise implemented by the computing system 1000. The online store 1002 may be owned and/or operated by a merchant associated with the user device 430. In some implementations, the object 450 may correspond to a product offered for sale in the online store 1002, and the modified 3D model 1012 may be sent from the computing system 1000 to customer devices to depict the product. Optionally, the modified 3D model 1012 may be presented alongside the digital media 700, 800 in the online store 1002.

The structure of the computing system 1000 is implementation specific. The computing system 1000 may include or implement a processor, memory, server, client, network interface, network infrastructure, mobile computing platform, cloud computing platform and/or stationary computing platform, for example. Optionally, the computing system 1000 is, or is part of, an e-commerce platform. For example, the computing system 1000 may be similar to the e-commerce platform 100, and the online store 1002 may be similar to the online store 138.

Figure 11:
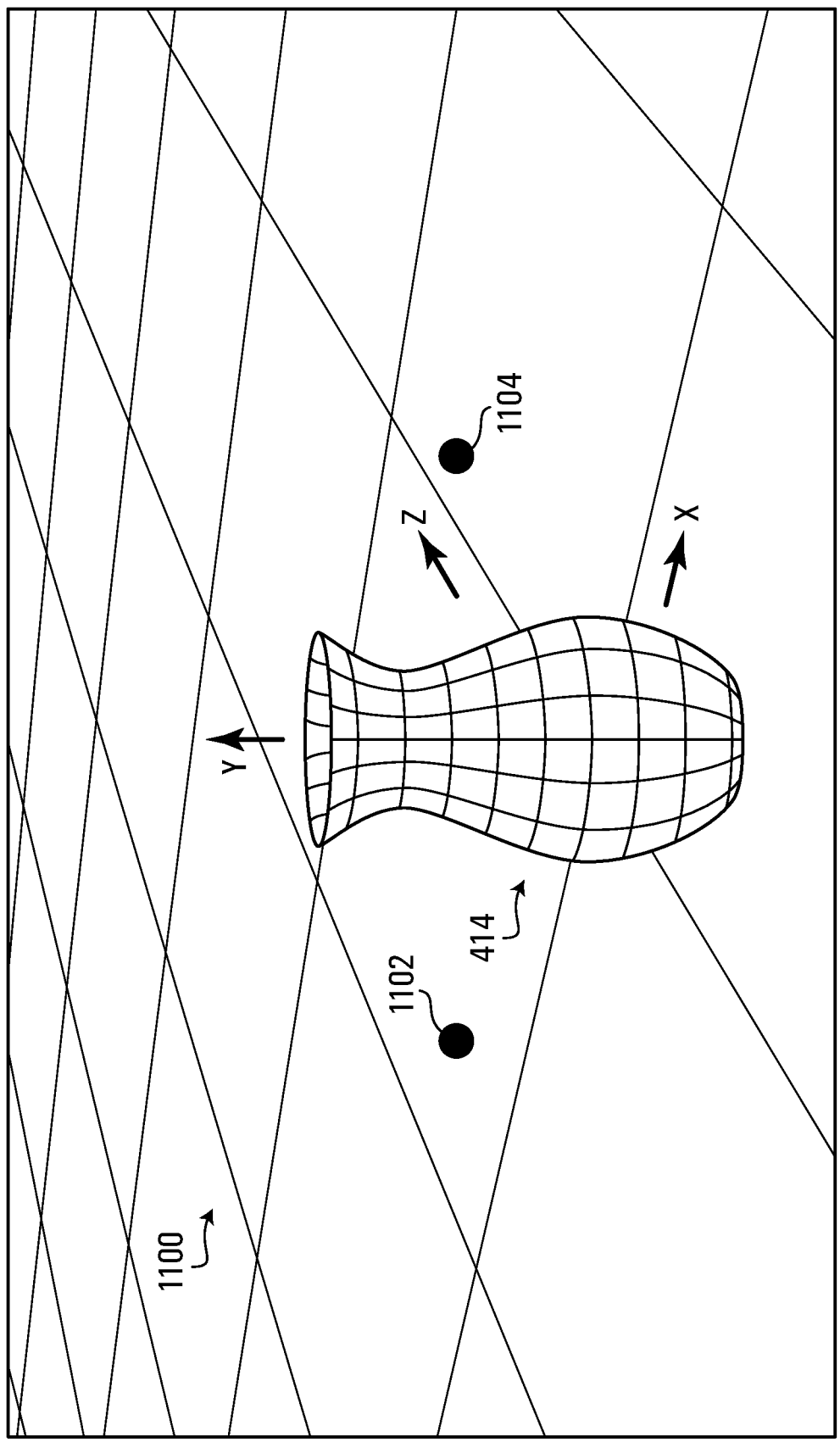
FIG. 11 illustrates a mesh and a virtual light source for the modified 3D model of FIG. 10, according to an embodiment.
Figure 12:
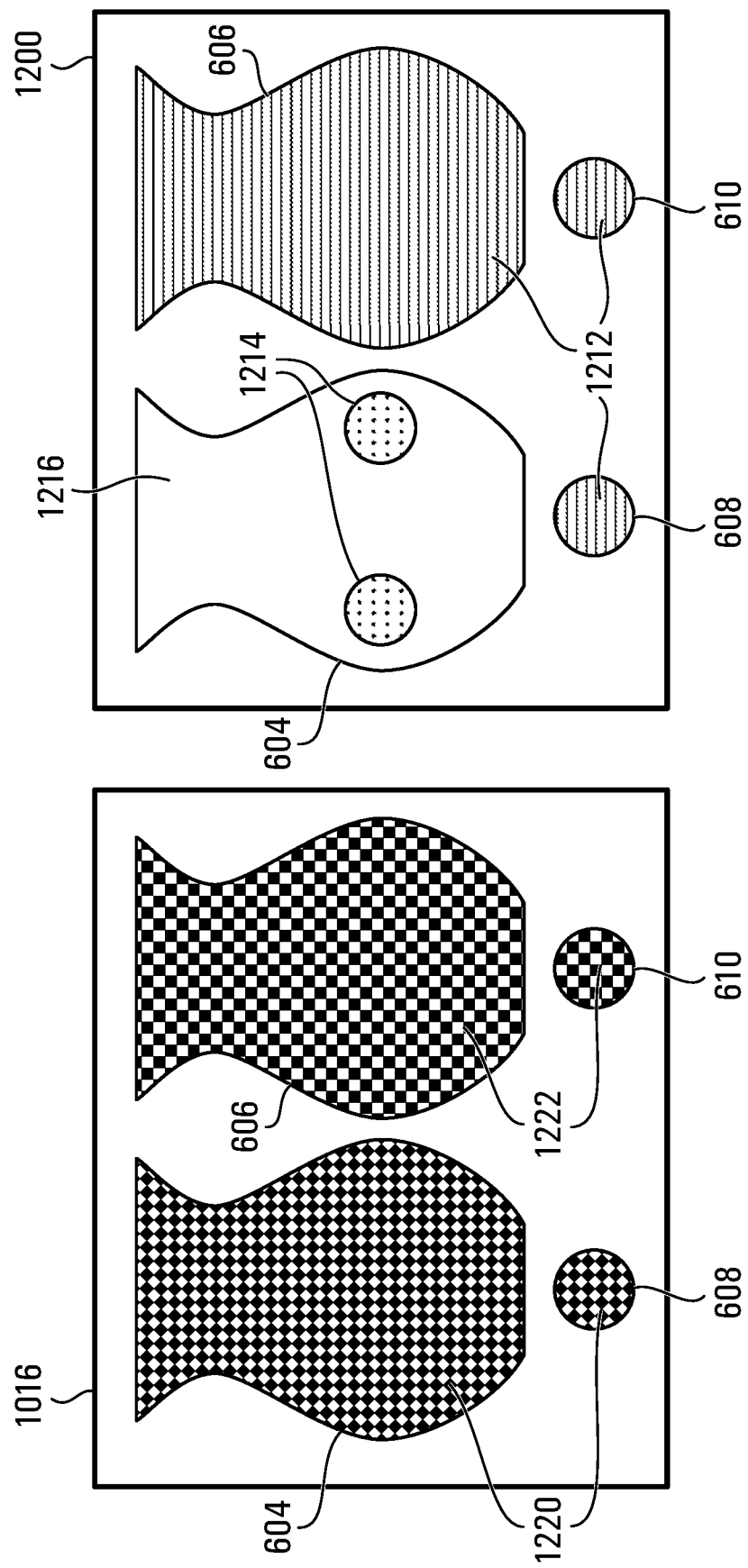
FIG. 12 illustrates a texture map and a light map for the modified 3D model of FIG. 10, according to an embodiment.

An example implementation of the modified 3D model 1012 is illustrated in FIGS. 11 and 12. FIG. 11 illustrates the mesh 414 and two virtual light sources 1102, 1104 defined within a virtual coordinate system 1100 of the modified 3D model 1012. The properties of the light sources 1102, 1104 are defined by the lighting 1018 in the modified 3D model 1012 and represent the lighting template used to generate the modified 3D model 1012. For example, the properties of the light sources 1102, 1104 may be determined in step 902 of the method 900. In some implementations, the properties of the light source 1102 may represent an average of the properties of the light sources 702, 802 depicted in the digital media 700, 800, and the properties of the light source 1104 may represent an average of the properties of the light sources 704, 804. For example, the position, orientation, brightness and/or color of the light source 1102 may be based on both of the light sources 702, 802. Alternatively, the properties of the light source 1102 may represent one of the light sources 702, 802 depicted in the digital media 700, 800, and the properties of the light source 1104 may represent one of the light sources 704, 804. Although not shown in FIG. 11, the lighting 1018 may also define other light sources, such as ambient light sources, for example.

In other implementations of the modified 3D model 1012, the light sources 1102, 1104 may be replaced by, or be supplemented by, an environment map defined by the lighting 1018. This environment map may be determined based on one or both instances of digital media 700, 800 in step 902 of the method 900.

FIG. 12 illustrates the texture map 1016 and a light map 1200 for the modified 3D model 1012. The texture map 1016 and the light map 1200 include the areas 604, 606, 608, 610 shown in FIG. 6, which represent the interior and exterior portions of the object 450. In the texture map 1016, the areas 604, 608 correspond to a material 1220 (shown using diamond checkerboard) on the exterior surfaces of the object 450, and the areas 606, 610 correspond to another material 1222 (shown using square checkerboard) on the interior surfaces of the object 450. The texture map 1016 may define the materials 1220, 1222 using respective material models. These material models may correspond to those used for the materials 620, 622 in FIG. 6. However, the materials 1220, 1222 might instead correspond to new material models for the modified 3D model 1012. For example, generating the modified 3D model 1012 may include adding, removing and/or modifying material models in the texture map 416 to better represent the lighting template.

The light map 1200 represents the simulated lighting conditions for the object 450 according to the lighting template. The light map 1200 may be determined based on the lighting 1018. For example, the light map 1200 may be calculated (e.g., during a baking process for the modified 3D model 1012) based on the properties of the light sources 1102, 1104 and an ambient light source defined by the lighting 1018. The light map 1200 identifies areas 1212 of the mesh 414 (shown using horizontal hashing) that are not illuminated by either of the light sources 1102, 1104 and might only be illuminated by the ambient lighting. The light map 1200 also identifies two areas 1214 of the mesh 414 (shown using stippling) corresponding to high-intensity illumination by the respective light sources 1102, 1104. For example, one of the areas 1214 corresponds to where the light source 1102 is closest to the mesh 414, and the other of the areas 1214 corresponds to where the light source 1104 is closest to the mesh 414. The light map 1200 further identifies an area 1216 of the mesh 414 (shown without shading) corresponding to low to moderate-intensity illumination by one or both of the light sources 1102, 1104. Again, as discussed above, while the areas 1212, 1214, 1216 of the light map 1200 are shown as discrete, there may, in at least some cases, be more gradual transitions therebetween.

The mesh 414, the texture map 1016 and the light map 1200 of the modified 3D model 1012 may help represent the appearance of the object 450 according to the lighting template. For example, a render of the modified 3D model 1012 may appear to be substantially similar to the digital media 700. In some implementations, comparing a render of the modified 3D model 1012 to the digital media 700 may be used to confirm that the lighting 1018 in the modified 3D model 1012 matches the lighting template. Further, comparing renders of the modified 3D model 1012 to the digital media 700 may be used to help determine the lighting template in step 902. For example, the light map 1200 may be iteratively modified to alter the lighting 1018 in the modified 3D model 1012. A render of the modified 3D model 1012 may be generated for each iteration of the light map 1200, and the render may be compared to the digital media 700 using image analysis algorithms. If one render closely matches the digital media 700, then the light map 1200 corresponding to that render may be considered to represent the lighting template depicted in the digital media 700.

The mesh 414 may be movable relative to the light sources 1102, 1104 in the virtual coordinate system 1100, such that different renders of the modified 3D model 1012 may depict different light interactions on the virtual surfaces of the mesh 414. For example, using the modified 3D model 1012, a user may be able to simulate moving the object 450 relative to lighting in a room. Alternatively or additionally, the position and orientation of the light sources 1102, 1104 in the virtual coordinate system 1100 may be treated as fixed relative to the mesh 414. For example, the light map 1200 may be fixed for the modified 3D model 1012. This may enable a user to manipulate the mesh 414 and the light sources 1102, 1104 simultaneously to see different aspects of the object 450 under constant lighting conditions. For example, the user may be able to simulate moving themselves around the object 450 in a room.

It should be noted that the modified 3D model 1012 is provided by way of example only. Other implementations of modified 3D models are also contemplated. The mesh 414, texture map 1016 and light map 1200 are shown in FIGS. 11 and 12 for illustrative purposes and greater clarity, and should not be considered limiting. For example, a modified 3D model may not include a mesh, a texture map and/or a light map in some implementations.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The invention claimed is:

1. A computer-implemented method comprising:
    determining, based on previously captured digital media depicting a real-world first physical object as lit by first lighting, a lighting template representing the first lighting, wherein determining the lighting template includes determining a position of a light source relative to the real-world first physical object as depicted in the digital media and further includes determining an environment map for an environment containing the real-world first physical object;
    obtaining a three-dimensional (3D) model that represents the real-world first physical object that is depicted in the digital media;
    obtaining a plurality of other 3D models that represent other real-world physical objects, wherein the other real-world physical objects are related to the real-world first physical object;
    normalizing second lighting of the 3D model to obtain normalized lighting;
    normalizing a plurality of lightings of the plurality of other 3D models, each of the plurality of lightings corresponding to a respective one of the plurality of other 3D models, to obtain the normalized lighting; and
    applying the lighting template to the 3D model that represents the real-world first physical object and to each one of the plurality of other 3D models so that the 3D model that represents the real-world first physical object and the plurality of other 3D model are all depicted with consistent lighting, wherein the applying the lighting template includes:
        generating, based on both (i) the 3D model that represents the real-world first physical object depicted in the digital media and (ii) the lighting template representing the first lighting in the digital media depicting the real-world first physical object, a modified 3D model that represents the real-world first physical object depicted in the digital media lit according to the lighting template, wherein generating the modified 3D model includes modifying the 3D model to have a virtual light source at a virtual position corresponding to the position of the light source relative to the real-world first physical object as depicted in the digital media, applying the environment map to the 3D model, and modifying the normalized lighting based on the lighting template; and
        generating, based on both (i) the plurality of other 3D models that represent other real-world physical objects and (ii) the lighting template representing the first lighting in the digital media depicting the real-world first physical object, a plurality of other modified 3D models lit according to the lighting template, wherein generating the plurality of other modified 3D models includes modifying each of the plurality of other 3D models to have a virtual light source at a virtual position corresponding to the position of the light source relative to the real-world first physical object as depicted in the digital media, applying the environment map to each of the plurality of other 3D models, and for each of the plurality of other 3D models, modifying the normalized lighting based on the lighting template.

2. The method of claim 1, wherein:
    determining the lighting template further comprises determining other properties of the light source other than the position of the light source relative to the real-world first physical object as depicted in the digital media; and
    wherein properties of the virtual light source are also based on the other properties of the light source.

3. The method of claim 2, wherein:
    determining the other properties of the light source comprises determining a type of light source; and the virtual light source comprises the same type of light source.

4. The method of claim 1, wherein determining the lighting template comprises:
comparing the modified 3D model to the digital media;
determining, based on the comparing, that the modified 3D model matches the digital media; and
responsive to determining that the modified 3D model matches the digital media, determining that the modified 3D model includes the lighting template.

5. The method of claim 4, wherein determining the lighting template comprises multiple iterations of:
generating a respective modified 3D model based on the 3D model and a respective lighting template; and
comparing the respective modified 3D model to the digital media.

6. The method of claim 1, wherein generating the modified 3D model comprises modifying a texture map of the 3D model based on the lighting template; and wherein generating the plurality of other modified 3D models comprises modifying a plurality of texture maps of the plurality of other 3D models based on the lighting template, each of the plurality of texture maps corresponding to a respective one of the plurality of other 3D models.

7. The method of claim 1, wherein:
the digital media comprises multiple different instances of digital media; and
determining the lighting template comprises averaging different lighting depicted in the different instances of digital media.

8. The method of claim 7, wherein the multiple different instances of digital media depict multiple different physical objects including the real-world first physical object.

9. The method of claim 1, wherein the real-world first physical object is the same as the 3D model that represents the real-world first physical object.

10. The method of claim 1, wherein the real-world first physical object corresponds to a product sold by a merchant.

11. The method of claim 1, wherein the digital media comprises at least one of an image, a video or a further 3D model.

12. A system comprising:
memory to store a three-dimensional (3D) model that represents a real-world first physical object that is depicted in previously captured digital media and a plurality of other 3D models that represent other real-world physical objects, wherein the other real-world physical objects are related to the real-world first physical object; and
at least one processor to:
determine, based on the previously captured digital media depicting the real-world first physical object as lit by first lighting, a lighting template representing the first lighting, wherein determining the lighting template includes determining a position of a light source relative to the real-world first physical object as depicted in the digital media and further includes determining an environment map for an environment containing the real-world first physical object;
normalize second lighting of the 3D model to obtain normalized lighting;
normalize a plurality of lightings of the plurality of other 3D models, each of the plurality of lightings corresponding to a respective one of the plurality of other 3D models, to obtain the normalized lighting; and
apply the lighting template to the 3D model that represents the real-world first physical object and to each one of the plurality of other 3D models so that the 3D model that represents the real-world first physical object and the plurality of other 3D model are all depicted with consistent lighting, wherein the applying the lighting template includes:
generating, based on both (i) the 3D model that represents the real-world first physical object depicted in the digital media and (ii) the lighting template representing the first lighting in the digital media depicting the real-world first physical object, a modified 3D model that represents the real-world first physical object depicted in the digital media lit according to the lighting template, wherein generating the modified 3D model includes modifying the 3D model to have a virtual light source at a virtual position corresponding to the position of the light source relative to the real-world first physical object as depicted in the digital media, applying the environment map to the 3D model, and modifying the normalized lighting based on the lighting template; and
generating, based on both (i) the plurality of other 3D models that represent other real-world physical objects and (ii) the lighting template representing the first lighting in the digital media depicting the real-world first physical object, a plurality of other modified 3D models lit according to the lighting template, wherein generating the plurality of other modified 3D models includes modifying each of the plurality of other 3D models to have a virtual light source at a virtual position corresponding to the position of the light source relative to the real-world first physical object as depicted in the digital media, applying the environment map to each of the plurality of other 3D models, and for each of the plurality of other 3D models, modifying the normalized lighting based on the lighting template.

13. The system of claim 12, wherein:
the lighting template comprises other properties of the light source other than the position of the light source relative to the real-world first physical object as depicted in the digital media; and
wherein properties of the virtual light source are also based on the other properties of the light source.

14. The system of claim 13, wherein:
the other properties of the light source comprise a type of light source; and
the virtual light source comprises the type of light source.

15. The system of claim 12, wherein the at least one processor is to:
compare the modified 3D model to the digital media;
determine, based on the comparison, that the modified 3D model matches the digital media; and
responsive to the determination that the modified 3D model matches the digital media, determine that the modified 3D model includes the lighting template.

16. The system of claim 15, wherein the at least one processor is to:
generate a plurality of modified 3D models based on the 3D model and respective lighting templates; and
compare the plurality of modified 3D models to the digital media to determine the lighting template representing the first lighting of the real-world first physical object as depicted in the digital media.

17. The system of claim 12, wherein the at least one processor is to modify a texture map of the 3D model based on the lighting template to generate the modified 3D model, and the at least one processor is to modify a plurality of texture maps of the plurality of other 3D models based on the lighting template to generate the plurality of other modified 3D models, wherein each of the plurality of texture maps corresponds to a respective one of the plurality of 3D models.

18. The system of claim 12, wherein:
the digital media comprises multiple different instances of digital media; and
the at least one processor is to average different lighting depicted in the different instances of digital media to determine the lighting template.

19. A non-transitory computer readable medium storing computer executable instructions which, when executed by a computer, cause the computer to:
determine, based on previously captured digital media depicting a real-world first physical object as lit by first lighting, a lighting template representing the first lighting, wherein determining the lighting template includes determining a position of a light source relative to the real-world first physical object as depicted in the digital media and further includes determining an environment map for an environment containing the real-world first physical object;
obtain a three-dimensional (3D) model that represents the real-world first physical object that is depicted in the digital media;
obtain a plurality of other 3D models that represent other real-world physical objects, wherein the other real-world physical objects are related to the real-world first physical object;
normalize second lighting of the 3D model to obtain normalized lighting;
normalize a plurality of lightings of the plurality of other 3D models, each of the plurality of lightings corresponding to a respective one of the plurality of other 3D models, to obtain the normalized lighting; and
apply the lighting template to the 3D model that represents the real-world first physical object and to each one of the plurality of other 3D models so that the 3D model that represents the real-world first physical object and the plurality of other 3D model are all depicted with consistent lighting, wherein the applying the lighting template includes:
generating, based on both (i) the 3D model that represents the real-world first physical object depicted in the digital media and (ii) the first lighting template representing the lighting in the digital media depicting the real-world first physical object, a modified 3D model that represents the real-world first physical object depicted in the digital media lit according to the lighting template, wherein generating the modified 3D model includes modifying the 3D model to have a virtual light source at a virtual position corresponding to the position of the light source relative to the real-world first physical object as depicted in the digital media, applying the environment map to the 3D model, and modifying the normalized lighting based on the lighting template; and
generating, based on both (i) the plurality of other 3D models that represent other real-world physical objects and (ii) the lighting template representing the first lighting in the digital media depicting the real-world first physical object, a plurality of other modified 3D models lit according to the lighting template, wherein generating the plurality of other modified 3D models includes modifying each of the plurality of other 3D models to have a virtual light source at a virtual position corresponding to the position of the light source relative to the real-world first physical object as depicted in the digital media, applying the environment map to each of the plurality of other 3D models, and for each of the plurality of other 3D models, modifying the normalized lighting based on the lighting template.

20. The method of claim 1, wherein:
determining the lighting template also includes determining an orientation of the light source relative to the real-world first physical object as depicted in the digital media; and
generating the modified 3D model and the plurality of other modified 3D models includes modifying the 3D model and the plurality of other 3D models to have the virtual light source at the virtual position and at an orientation corresponding to the position and orientation of the light source relative to the real-world first physical object as depicted in the digital media.

21. The system of claim 12, wherein:
determining the lighting template also includes determining an orientation of the light source relative to the real-world first physical object as depicted in the digital media; and
generating the modified 3D model and the plurality of other modified 3D models includes modifying the 3D model and the plurality of other 3D models to have the virtual light source at the virtual position and at an orientation corresponding to the position and orientation of the light source relative to the real-world first physical object as depicted in the digital media.

* * * * *

UNITED STATES PATENT AND TRADEMARK OFFICE
CERTIFICATE OF CORRECTION

PATENT NO. : 11,847,736 B2
APPLICATION NO. : 17/237372
DATED : December 19, 2023
INVENTOR(S) : Byron Leonel Delgado et al.

It is certified that error appears in the above-identified patent and that said Letters Patent is hereby corrected as shown below:

In the Claims

At Column 36, Line 22, Claim 1, "and the plurality of other 3D model" should be – and the plurality of other 3D models –;

At Column 38, Line 3, Claim 12, "and the plurality of other 3D model" should be – and the plurality of other 3D models –; and At Column 39, Line 42, Claim 19, "and the plurality of other 3D model" should be – and the plurality of other 3D models –.

Signed and Sealed this
Twenty-sixth Day of March, 2024

Katherine Kelly Vidal
*Director of the United States Patent and Trademark Office*